(12) United States Patent
Masaki et al.

(10) Patent No.: US 8,841,816 B2
(45) Date of Patent: Sep. 23, 2014

(54) ENERGY CONVERSION DEVICE OF ELECTROSTATIC INDUCTION TYPE

(75) Inventors: Tatsuakira Masaki, Nara (JP); Kenji Sakurai, Kizugawa (JP); Yuji Suzuki, Bunkyo-ku (JP)

(73) Assignee: OMRON Corporation, Kyoto-Shi, Kyoto (JP)

( * ) Notice: Subject to any disclaimer, the term of this patent is extended or adjusted under 35 U.S.C. 154(b) by 504 days.

(21) Appl. No.: 13/133,496

(22) PCT Filed: Nov. 12, 2009

(86) PCT No.: PCT/JP2009/006047
§ 371 (c)(1),
(2), (4) Date: Aug. 10, 2011

(87) PCT Pub. No.: WO2010/067518
PCT Pub. Date: Jun. 17, 2010

(65) Prior Publication Data
US 2012/0169179 A1 Jul. 5, 2012

(30) Foreign Application Priority Data
Dec. 8, 2008 (JP) .................... 2008-312742

(51) Int. Cl.
*H02N 1/00* (2006.01)
*H02N 11/00* (2006.01)
*H01G 7/02* (2006.01)
*H02N 1/08* (2006.01)

(52) U.S. Cl.
CPC ... *H01G 7/02* (2013.01); *H02N 1/08* (2013.01)
USPC ................ 310/309; 310/300; 310/310

(58) Field of Classification Search
CPC ........... H02N 1/00; H02N 2/18; H02N 11/002
USPC ........................... 310/308, 309, 310
See application file for complete search history.

(56) References Cited

U.S. PATENT DOCUMENTS 6,842,009 B2 * 1/2005 Potter .................... 324/633
7,280,014 B2 * 10/2007 Potter .................... 335/78
(Continued)

FOREIGN PATENT DOCUMENTS

| EP | 1 837 685 A1 | 9/2007 |
|---|---|---|
| JP | 2006-180450 A | 7/2006 |

(Continued)

OTHER PUBLICATIONS

Supplemental European Search Report for European Application No. 08791173.1-2217 dated May 21, 2012 (6 pages).
(Continued)

*Primary Examiner* — Terrance Kenerly
(74) *Attorney, Agent, or Firm* — Osha Liang LLP

(57) ABSTRACT

On an upper surface of a fixed substrate, a plurality of strap-shaped base electrodes are arranged in parallel to each other. On each of the base electrodes, an electret is formed. The electret has a width wider than the width of each base electrode, and the electret covers an exposed surface of the base electrode. A movable substrate is disposed in parallel to and facing the surface of the fixed substrate where the electrets and others are formed. The movable substrate is movable relatively to the fixed substrate. On a facing surface of the movable substrate, strip-shaped counter electrodes are each formed so as to face each base electrode.

18 Claims, 22 Drawing Sheets

(56) References Cited

U.S. PATENT DOCUMENTS

| | | | |
|---|---|---|---|
| 2002/0050764 A1* | 5/2002 | Koga et al. | 310/309 |
| 2003/0053227 A1* | 3/2003 | Kaneko | 359/846 |
| 2004/0105646 A1 | 6/2004 | Fukuda et al. | |
| 2006/0113862 A1* | 6/2006 | Suzuki et al. | 310/309 |
| 2008/0232026 A1* | 9/2008 | Ward | 361/311 |
| 2009/0051242 A1* | 2/2009 | Suzuki et al. | 310/300 |
| 2010/0013047 A1* | 1/2010 | Thies et al. | 257/532 |
| 2010/0019616 A1 | 1/2010 | Naruse et al. | |
| 2012/0217842 A1 | 8/2012 | Naruse et al. | |

FOREIGN PATENT DOCUMENTS

| | | |
|---|---|---|
| JP | 2008-086190 A | 4/2008 |
| JP | 2008-112781 A | 5/2008 |
| JP | 2008-161036 A | 7/2008 |

OTHER PUBLICATIONS

International Search Report issued in PCT/JP2009/006047, mailed on Feb. 2, 2010, with translation, 3 pages.

Written Opinion issued in PCT/JP2009/006047, mailed on Feb. 2, 2010, 3 pages.

Y. Arakawa, et al., "Micro Seismic Power Generator using Electret Polymer Film", The Fourth International Workshop on Micro and Nanotechnology for Power Generation and Energy Conversion Applications Power MEMS 2004, Nov. 28-30, 2004, Kyoto, Japan, pp. 187-190, 4 pages.

Justin Boland et al., "Micro Electret Power Generator", Department of Electrical Engineering, California Institute of Technology, Department of Mechanical Engineering, The University of Tokyo, Tokyo, JP, 2003 pp. 538-541.

Japan Parylene Co., Ltd., "What is Parylene Is", (http://www.parylene.co.jp/about%20parylene-2htm) on Jul. 16, 2008, with English translation thereof (4 pages).

Office Action issued in Chinese Application No. 200980149184.5, mailed on Jul. 2, 2013, and translation thereof (10 pages).

Supplemental European Search Report for European Application No. 09831626.8 dated Mar. 25, 2014 (8 pages).

* cited by examiner

ENERGY CONVERSION DEVICE OF ELECTROSTATIC INDUCTION TYPE

BACKGROUND OF INVENTION

1. Technical Field

One or more embodiments of the present invention relate to energy conversion devices of an electrostatic induction type and, specifically, to an energy conversion device of an electrostatic induction type for electric power generation by using environmental vibration or the like.

2. Background Art

In a distributed system device or portable device equipped with a sensor or an actuator, direct power feeding by wire connection (electric cords) is difficult. Therefore, as a power supply, a coin primary battery or chargeable battery is used.

However, in a TPMS (tire-pressure monitoring system) monitoring a tire air pressure of a vehicle, health monitoring of airplanes, buildings, bridges and others, and large-scale distribution management, replacement of batteries may be difficult and troublesome, and it need to change a large quantity of batteries. Thus, using a batter as a power supply is inconvenient. Moreover, for the use purpose as a cardiac pacemaker, a capsule endoscope and others, the patient has to undergo surgery to replace batteries and therefore carry a heavy physical burden. Furthermore, even in the case of a chargeable battery, there are inconveniences similar to those in replacement of batteries, regarding a recharging operation.

Therefore, in various fields including those described above, a technology of making a power supply maintenance-free (eliminating the need of recharging or replacement of batteries) is desired.

As a possibility for maintenance-free measure, there is a small-sized energy conversion device capable of extracting power from vibrations of several Hz to several tens of Hz occurring in a moving body (such as a vehicle or an airplane), a structure (such as a building or a bridge) or the like, or occurring due to the motion of an apparatus or a human (hereinafter, such vibrations are referred to as ambient vibrations).

Energy conversion devices generating power by ambient vibrations mainly come in three types: an electromagnetic induction type, a piezoelectric type, and an electrostatic induction type. In a device of the electromagnetic induction type, because the amount of power generation is proportional to the square of the frequency of vibration, it is difficult to extract power from low frequency of vibration. Moreover, the size and the weight of the device are disadvantageously large. A device of the piezoelectric type has issues in reliability, mass productivity, such as handling at the time of assembling, and cost. For this reason, expectations have been placed on a device of the electrostatic induction type.

The energy conversion device of the electrostatic induction type is suitable for obtaining power by using ambient vibration because the amount of power generation is proportional to the frequency of vibration. However, to obtain a large amount of power generation, a large amount of electric charge has to be injected into electret electrodes. Also, if the charge amount of the electret electrodes is increased, degradation in power generation efficiency due to discharge arises. However, in a conventional energy conversion device of an electrostatic induction type, these issues have not been solved, and a sufficient electric charge is not allowed to be injected into the electrets. Furthermore, degradation in power generation efficiency due to discharge is not sufficiently prevented.

In the following, these issues are specifically described by taking an energy conversion device disclosed in Patent Document 1 as an example.

(Device Disclosed in Patent Document 1)

The structure of an energy conversion device 11 (an electrostatic-induction conversion device) disclosed in Patent Document 1 is disclosed in FIG. 1. In this energy conversion device 11, a plurality of strap-shaped base electrodes 13 are provided on an upper surface of a fixed substrate 12, and an electret 14 is provided on each of the base electrodes 13. Also, on a lower surface of a counter substrate 15 facing the fixed substrate 12, counter electrodes 16 are provided with the same pitch as that of the base electrodes 13.

The electrets 14 are formed by injecting an electric charge into an area near the surface of an insulating material. In particular, as a material of the electrets 14, the material is formed of a polymer having a fluorine-containing aliphatic ring structure in a main chain, thereby increasing a surface charge density. Also, in an embodiment disclosed in Patent Document 1, on an upper surface of the electrets 14, a moisture-proof film (parylene film) formed of poly-para-xylylene or its derivative is formed, thereby preventing degradation due to moisture.

In the above-structured energy conversion device 11, a load 17 is connected between two electrodes 13 and 16 and, when the counter substrate 15 is moved in a direction indicated by an arrow in FIG. 1, an opposite electric charge is electrostatically induced to the counter electrode 16 by an electric charge injected into the electrets 14 to let a current flow through the load 17, thereby allowing usage for electric power generation.

(Decrease in Amount of Electric Charge Injected)

As a method of injecting an electric charge into the electrets 14, a method by corona discharge is general. In Patent Document 1, as depicted in FIG. 2, a needle for corona discharge 18 is used. By using a direct-current high-voltage power supply 19, a high voltage is applied between the needled 18 and the base electrode 13 for discharge for a predetermined time at a predetermined voltage, thereby injecting an electric charge into the electrets 14 for charging.

However, because the electrets 14 are formed on the upper surface of the base electrodes 13, the side walls of the base electrodes 13 are exposed from the electrets 14. For this reason, as the electret 14 on the left in FIG. 2, most of the electric charge (electrons) discharged from the needle 18 are induced to the base electrode 13 to be returned to the high-voltage power supply 19 (lines with arrows in FIG. 2 each represents a flow of electric charge at the time of discharge), and the amount of electric charge to be injected into the electret 14 is decreased correspondingly.

Also, the electret 14 and the base electrode 13 are formed by a semiconductor process (a photolithography process). However, even if the electret 14 and the base electrode 13 are designed to be formed so as to have the same area, the breadth of the electret 14 on the base electrode 13 tends to vary due to alignment deviation in a manufacturing process or process error, such as overetching of the electret 14. For this reason, as the electret 14 on the right in FIG. 2, the edge of the base electrode 13 tends to appear from under the electret 14 to be exposed. In such cases, the amount of electric charge induced to the base electrode 13 is further increased, and the amount of electric charge to be injected into the electret 14 is further decreased.

(Degradation Due to Discharge)

To obtain an amount of power generation of 0.1 mW or more by using ambient vibration (on the order of 10 Hz), a gap between the upper electrode 16 and the lower electrode 13 has to be set on the order of 50 µm (refer to Non-Patent Document 1). However, when the gap is set on the order of 50 µm, even if the surface of each electret 14 is covered with a moisture-proof film formed of a parylene film having a thickness of 0.3 µm, a discharge occurs between the upper and the lower electrodes because the loaded voltage exceeds a dielectric strength voltage between the substrate with air and the moisture-proof film having a thickness of 0.3 µm, thereby disadvantageously causing the electric charge held in the electret 14 to be drawn away (refer to Non-Patent Document 2).

To increase the dielectric strength voltage, the film thickness of the moisture-proof film is increased. However, when the film thickness of the moisture-proof film is increased, cost is increased, which is inconvenient. Moreover, because parylene has a high relative dielectric constant, when the film thickness of the moisture-proof film is increased, the possibility of decreasing the amount of power generation of the energy conversion device 11 is increased. For this reason, according to Non-Patent Document 1, the energy conversion device has to be sealed with SF6. Therefore, in conventional art, the energy conversion device has to be hermetically sealed in a ceramic package or the like, which increases the price of a package of the energy conversion device.

Furthermore, because the dielectric strength voltage is defined by a distance between the upper and the lower electrodes, it is required as an anti-discharge measure to fabricate a device not exceeding the dielectric strength voltage irrespectively of the interelectrode distance. In particular, irrespectively of the distance between the upper and the lower electrodes, a discharge is desirably prevented from occurring from an electret with a surface potential of 1000 V.

PRIOR ART DOCUMENTS

Patent Document

Patent Document 1: Japanese Unexamined Patent Application Publication No. 2006-180450

Non-Patent Documents

Non-Patent Document 1: Y. Arakawa, Y. Suzuki, N. Kasagi, "Micro Seismic Power Generator using Electret Polymer Film", The fourth International Workshop on Micro and Nanotechnology for Power Generation and Energy Conversion Applications Power MEMS 2004, Nov. 28-30, 2004, Kyoto, Japan, pp. 187-190

Non Patent Document 2: "What is Parylene is", [online], Japan Parylene Co., Ltd., [Searched on Jun. 16, 2008], the Internet, <URL: http://www.parylene.co.jp/about%20parylene-2.htm>

SUMMARY OF INVENTION

One or more embodiments of the present invention may provide an energy conversion device of an electrostatic induction type capable of charging a large amount of electric charge into electrets. Also, one or more embodiments of the present invention may provide an energy conversion device of an electrostatic induction type with less degradation due to discharge and high reliability.

An energy conversion device of one or more embodiments of the present invention includes a first substrate and a second substrate facing each other at a predetermined distance away and capable of moving relatively with each other; at least one conductive member formed on the first substrate and the second substrate each having a surface facing each other; a plurality of electrodes and a electrode pad provided on each of the conductive members; and an electret provided on at least one of the conductive members and formed correspondingly to each of the electrodes, wherein the electret covers a surface among surfaces of each of the electrodes that is opposite to a surface fixed to any of the substrates and covers an outer perimeter surface of each of the electrodes with a coating thickness equal to or larger than 5 µm.

In the energy conversion device of one or more embodiments of the present invention, on the substrate provided with the electrodes and the electrets, each electret covers a surface opposite to the surface among the surfaces of each electrode that is opposite to the surface fixed to any of the substrates, and covers the outer perimeter surface of each electrode with a coating thickness equal to or larger than 5 µm. Therefore, when an electric charge is injected into the electret for charging, the electric charge is less prone to be induced to the electrode, thereby preventing a decrease in the amount of electric charge to be injected into the electret. Thus, a more electric charge can be held in the electret, the surface potential of the electret can be increased, and the amount of power generation can be increased.

In one or more embodiments of the energy conversion device according to the present invention, the outer perimeter surface of each of the electrodes on which the electret is formed is covered with the electret having a coating thickness equal to or larger than 10 µm. According to one or more embodiments of the present invention, the surface potential of the electret can be further increased, and fluctuations in surface potential can also be decreased.

In one or more embodiments of the energy conversion device according to the present invention, at least one of the first substrate and the second substrate has a plurality of grooves provided in parallel to each other and in a recessed manner, the electrodes are each disposed in each of the grooves, and the electret is buried in the groove and the electrode in the groove is covered with the electret. According to one or more embodiments of the present invention, the electrode disposed in the groove is covered with the electret buried in the groove. Therefore, the electrode can be reliably covered with the electret, thereby improving reliability of the device. Also, by burying the electrode in the groove, an electric charge can be more reliably prevented from flowing into the electrode at the time of electric charge injection, and the surface potential of the electret can be more increased to increase the amount of power generation.

As for the shape of the groove, the groove may have a cross section perpendicular to its longitudinal direction being in a rectangular shape with a curved inner corner portion, being in a trapezoidal shape with an opening portion having a width wider than a width of a bottom surface, or being in a triangular shape with a wider opening side. According to the groove having any of these shapes, air bubbles are less prone to be trapped in the electret buried in the groove. Also, the electret can be easily injected into the groove.

When the substrate is a glass substrate, a semiconductor substrate, or a resin substrate, the grooves can be formed in the substrate by dry etching. Also, when the substrate having the grooves or a part of the substrate is formed of a resin material, the grooves are formed by using a transfer technology when the resin material is molded. Furthermore, when the substrate having the grooves is a Si substrate, the grooves may be formed in the substrate by using anisotropic etching, and the grooves each may have a surface formed with an insulating film made of $SiO_2$, SiN, or SiON. According to these methods, fine grooves can be fabricated with high accuracy.

In one or more embodiments of the energy conversion device according to the present invention, on a facing surface of at least one of the first substrate and the second substrate, an entire region of the conductive member excluding a region where the electrode pads are formed is covered with an insulating coating.

When the amount of electric charge charged in the electret is increased, a discharge tends to occur between the electrodes of the first and the second substrates and between the electret and the electrode. However, in one or more embodiments of the present invention, because the entire region excluding the region where the electrode pads are formed is covered with the insulating coating, the dielectric strength voltage between the electrodes can be improved, thereby suppressing a decrease in surface potential of the electret and also improving reliability of the energy conversion device.

Still further, to prevent discharge between the conductive members of the first and the second substrates, as described in the one or more embodiments above, almost the entire facing surfaces of the first and the second substrates may be each covered with an insulating coating. However, by covering only an electrode not covered with the electret with an insulating coating, the dielectric strength voltage can be improved. Furthermore, a guard electrode may be provided between adjacent ones of the electrets, and in at least one of the first substrate and the second substrate, only an electrode not covered with the electret and the guard electrode may be covered with an insulating coating.

As the insulating coating, an insulating high polymer material may be used, such as BCB (benzocyclobutene) resin or SiLk resin (manufactured by Dow Chemical Company), or an insulating inorganic material, such as $SiO_2$, $SiN$, $SrTiO_3$, $SiON$, and $TiO_2$. With the use of the insulating coating made of any of these materials, the dielectric strength voltage between the conductive members can be more increased.

Note that one or more embodiments of the present invention have features obtained by combining the above-described components as appropriate, and one or more embodiments of the present invention can have a large number of variations by these combinations of the components.

DETAILED DESCRIPTION

In the following, embodiments of the present invention are described with reference to the attached drawings. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

(First Embodiment)

In the following, a first embodiment of the present invention is described with reference to FIG. 3 to FIG. 12.

Figure 3:
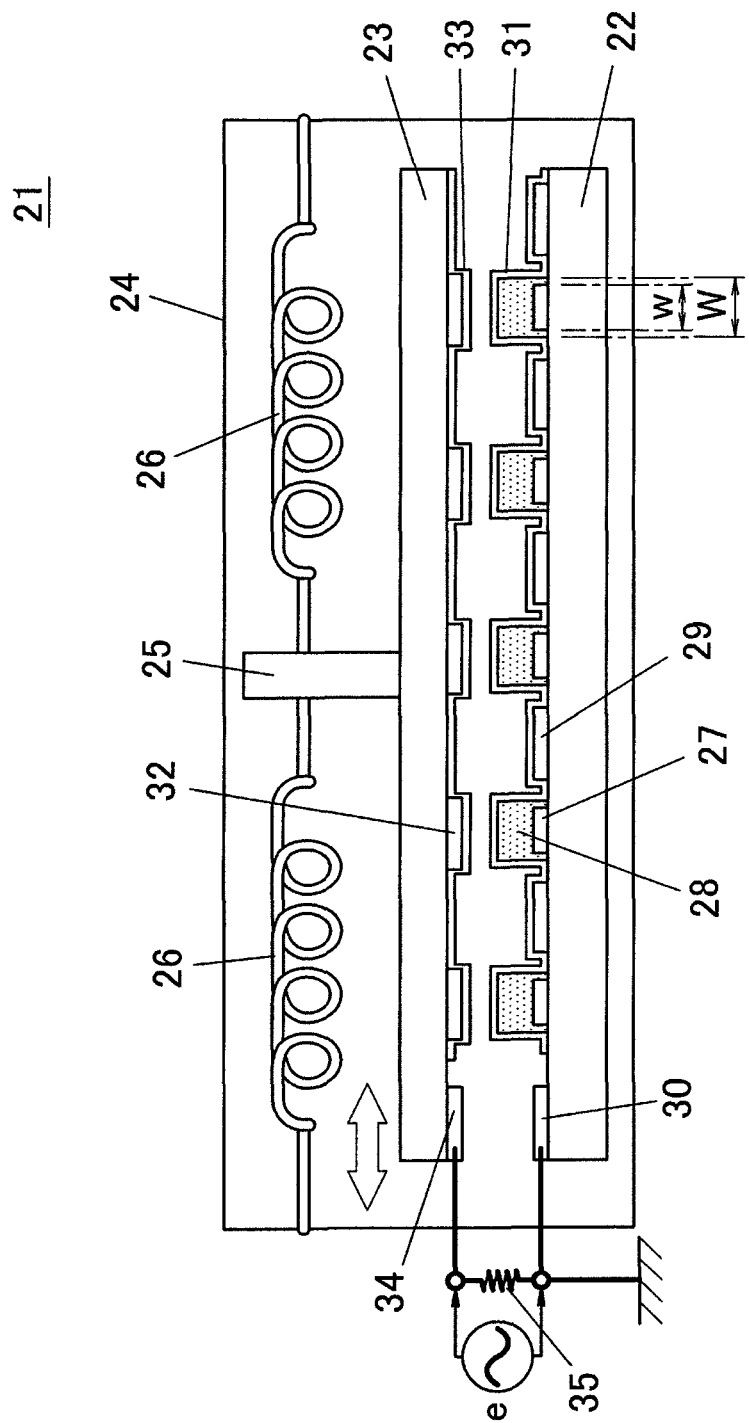
FIG. 3 is a schematic front view depicting the structure of an energy conversion device according to a first embodiment of the present invention.
Figure 4:
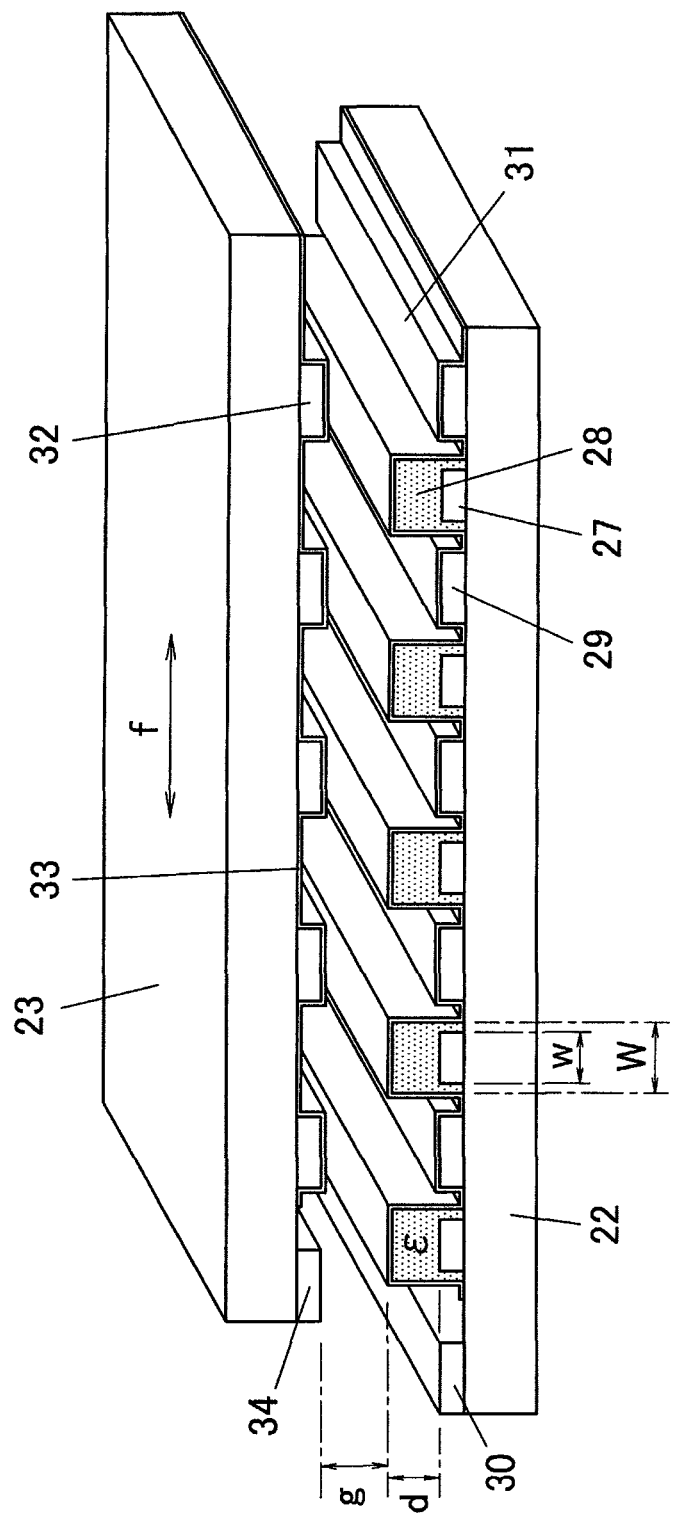
FIG. 4 is a perspective view depicting a main part of the energy conversion device of the first embodiment.

FIG. 3 is a schematic front view depicting the structure of an energy conversion device according to the first embodiment of the present invention. FIG. 4 is a perspective view depicting its main part. According to FIG. 3 and FIG. 4, the structure of an energy conversion device 21 (a power generating device) of the first embodiment is described.

The energy conversion device 21 of the first embodiment includes a fixed substrate 22 and a movable substrate 23. The substrates 22 and 23 faces each other in parallel at a predetermined distance away. The fixed substrate 22 and the movable substrate 23 are substrates having insulating properties, such as a glass substrate or a resin substrate. The fixed substrate 22 and the movable substrate 23 are accommodated in a casing 24. The fixed substrate 22 is fixed in the casing 24. The movable substrate 23 is held in the casing 24 so as to make translation in one direction with a state parallel to the fixed substrate 22 being kept.

On an upper surface of the movable substrate 23, a spring fixing part 25 is provided so as to protrude. Between the spring fixing part 25 and the casing 24, a plurality of springs 26 (tensile springs) are stretched. One or plurality of springs 26 are disposed on both sides of the spring fixing part 25, extending in parallel to a moving direction of the movable substrate 23. The movable substrate 23 is forcefully subjected to translation (vibration) by vibrations from outside, for example, ambient vibrations. When no force is exerted from outside, the movable substrate 23 stands still at or returns to a predetermined initial position depending on the balance of elastic forces between the left and the right springs 26. Also, the springs 26 each have a function of, when impacts or large vibrations are added to the movable substrate 23, absorbing the impacts or the vibrations added to the movable substrate 23 for protection. Furthermore, when large vibrations are added, the springs 26 absorb vibration energy from outside and temporarily hold it as elastic energy, and then releases this elastic energy, thereby allowing the movable substrate 23 to vibrate. Therefore, vibration energy can be efficiently used to generate power.

On an inner surface (an upper surface) of the fixed substrate 22, strip-shaped base electrodes 27 (electrodes) elongated in one direction are provided each with a predetermined pitch and in parallel to each other. A longitudinal direction of the base electrodes 27 is orthogonal to a moving direction of the movable substrate 23, and an arranging direction of the base electrodes 27 is parallel to the moving direction of the movable substrate 23. The fixed substrate 22 includes a pad for signal extraction 30 (an electrode pad), and each base electrode 27 is electrically connected via a wiring pattern to the pad for signal extraction 30. Also, between the base electrodes 27, a strip-shaped guard electrode 29 is provided in parallel to the base electrodes 27. The guard electrode 29 may be connected to ground, or may be in a state of electrically floating from ground.

On an upper surface of each base electrode 27, an electret 28 is formed of Teflon (registered trademark) or fluororesin. The electret 28 has a width W wider than a width w of the base electrode 27 (that is, W>w), and the upper surface and the entire outer perimeter surface of the base electrode 27 are covered with the electret 28. In FIG. 3 and FIG. 4, an end face of the base electrode 27 in a longitudinal direction is viewed as being exposed from the electret 28, but both side surfaces in a width direction and both end faces in a longitudinal direction of the base electrode 27 are covered with the electret 28.

Figure 5:
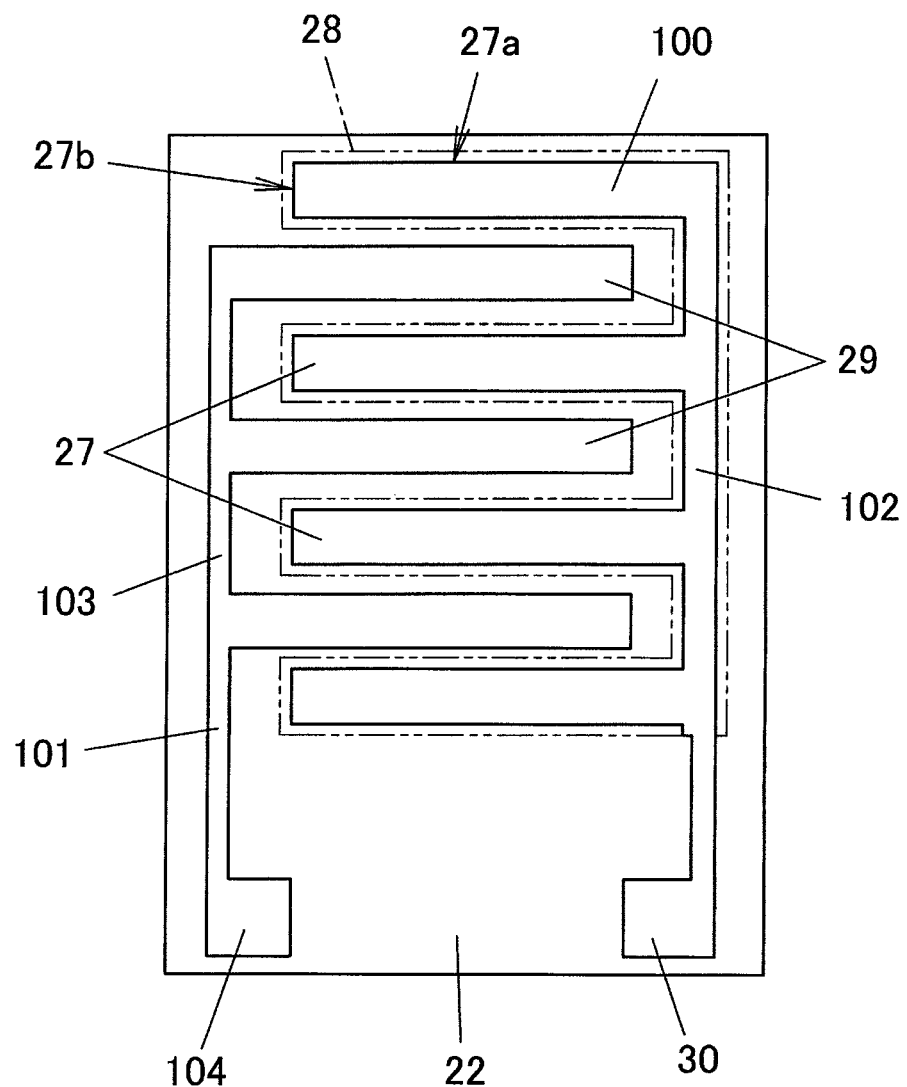
FIG. 5 is a plan view depicting a conductive member for base electrode and a conductive member for guard electrode formed on a fixed substrate.

The base electrodes 27 and the guard electrodes 29 are, in practice, in a pattern shape as depicted in FIG. 5. On the fixed substrate 22, a conductive member 100, for base electrodes in a comb-toothed shape and a conductive member 101, for guard electrodes in a comb-toothed shape are provided. The conductive member 100 is configured of the base electrodes 27 arranged with predetermined pitches, a conduction path 102 connecting each base electrode 27, and the pad for signal extraction 30. The conductive member 101 is configured of the guard electrodes 29 arranged with predetermined pitches, a conduction path 103 connecting each guard electrode 29, and an electrode pad 104. And, the conductive members 100 and 101 are disposed so as to engage with each other, and the base electrodes 27 and the guard electrodes 29 are alternately arranged. And, in the conductive member 100, an entire region of a surface exposed from the fixed substrate 22 excluding the pad for signal extraction 30 is covered with the electrets 28. In particular, both side surfaces 27a in a width direction and an end face 27b in a longitudinal direction of the base electrode 27 and both side surfaces of the conduction path 102 are covered with the electret 28.

Furthermore, exposed parts of the electrets 28, the guard electrodes 29, and the fixed substrate 22 (that is, a region excluding a region provided with the pad for signal extraction 30) are covered with an insulating coating 31.

On an inner surface (a lower surface) of the movable substrate 23, strip-shaped counter electrodes 32 (electrodes) elongated in one direction are provided in parallel to each other. A longitudinal direction of the counter electrodes 32 is orthogonal to the moving direction of the movable substrate 23, and an arranging direction of the counter electrodes 32 is parallel to the moving direction of the movable substrate 23. The counter electrodes 32 each have a width equal to the width w of the base electrode 27 or the width W of the electret 28 or a width at a midpoint between the widths w and W, and are arranged with pitches equal to those of the base electrodes 27. The movable substrate includes a pad for signal extraction 34, and each counter electrode 32 is electrically connected via a wiring pattern to the pad for signal extraction 34 (an electrode pad). Furthermore, exposed parts of the counter electrodes 32 and the movable substrate 23 (that is, a region excluding a region provided with the pad for signal extraction 34) are covered with an insulating coating 33.

Note that, although not shown, as with the base electrodes 27 and the pad for signal extraction 30, the counter electrodes 32 and the pad for signal extraction 34 each form a part of a comb-toothed conductive member, and the counter electrodes 32 are connected to each other via a conduction path.

The insulating coatings 31 and 33 may be obtained by forming a film of an insulating inorganic material, such as $SiO_2$, SiN, SiON, $SrTiO_3$, or $TiO_2$, which is a material with a high dielectric strength voltage, on the entire surface excluding a pad region by sputtering or CVD, or may be obtained by coating the entire surface excluding a pad region with an insulating high polymer material, such as polyimide with a low permittivity, BCB resin, or SiLK resin. These insulating coatings 31 and 33 also have a moisture absorbing effect. Furthermore, to increase the dielectric strength voltage, the insulating coatings 31 and 33 may be provided on the fixed substrate 22 and the movable substrate 23, but only any one of the fixed substrate 22 and the movable substrate 23 may be provided with the insulating coating 31 or 33.

The pad for signal extraction 30 is connected to ground, and a load 35 is connected between the pad for signal extraction 34 and the pad for signal extraction 30.

Note that, when the fixed substrate 22 is a non-insulated substrate or insufficient insulating substrate, an insulating film made of $SiO_2$, SiN, SiON, $SrTiO_3$, or $TiO_2$ may be formed on the upper surface of the fixed substrate 22, and the base electrodes 27, the electrets 28, the guard electrodes 29, and the pad for signal extraction 30 may be formed on the surface of this insulating film. Similarly, when the movable substrate 23 is a non-insulated substrate or insufficient insulating substrate, an insulating film made of $SiO_2$, SiN, SiON, $SrTiO_3$, or $TiO_2$ may be formed on the lower surface of the movable substrate 23, and the counter electrodes 32 and the pad for signal extraction 34 may be formed on the surface of this insulating film.

Also, at an initial position of the movable substrate 23 described above, it is possible that the counter electrode 32 of the movable substrate 23 and the base electrode 27 of the fixed substrate 22 correctly face each other.

(Method of Injecting on Electric Charge)

Figure 6:
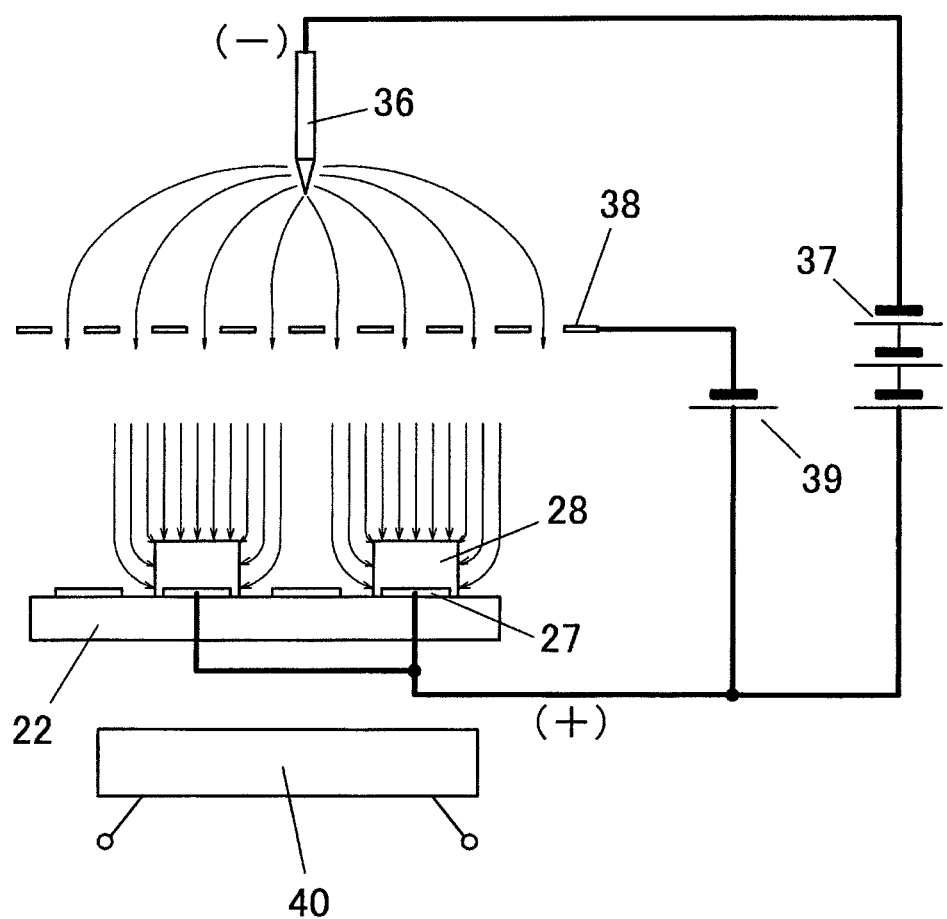
FIG. 6 is a schematic diagram depicting the state in which an electric charge is injected into electrets in the energy conversion device of the first embodiment.

Into the surface of the electrets 28, an electric charge is injected, and the electric charge is fixed. As a method of injecting an electric charge into the electrets 28, a method by corona discharge or the like is used. FIG. 6 depicts the structure of an apparatus for electric charge injection, and the apparatus include a needle 36, grids 38 disposed therebelow, a heater 40 disposed therebelow, a high-voltage power supply 37 (for example, a direct-current power supply of −8 kV) for applying a negative voltage to the needle 36, and a grid-voltage power supply 39 (for example, a direct-current power supply of −600 V) for applying a negative voltage to the grids 38. The fixed substrate 22 formed with the base electrodes 27 and the electrets 28 is placed between the heater 40 and the grids 38, and is preheated by the heater 40 at a temperature on the order of 120 degrees Celsius. Next, the direct-current high-voltage power supply 37 is connected between the needle 36 and the base electrodes 27 to apply a high voltage therebetween so that a needle 36 side becomes at a negative voltage, and causes an air discharge on the periphery of the tip of the needle 36, thereby injecting an electric charge into the electrets 28.

At this time, in the energy conversion device 21 of the present embodiment, the upper surface and both side surfaces in a width direction of each base electrode 27 is entirely covered with the electret 28. Therefore, as depicted in lines with arrows in FIG. 6, the amount of electric charge to be injected into the electret 28 can be increased without causing electric charges (electrons) discharged from the needle 36 to go into both side surfaces of the base electrode 27 to be a loss, the surface potential of the electret 28 can be increased, and power generation efficiency can be increased.

Note that a negative voltage weaker than that of the high-voltage power supply 37 is applied to the grids 38 by the grid-voltage power supply 39 to spread the electric charge discharged from the needle 36 all over. Also, by adjusting the grid voltage, an electric field to be applied to the electrets 28 can be controlled.

(Surface Potential of Electret)

Figure 7:
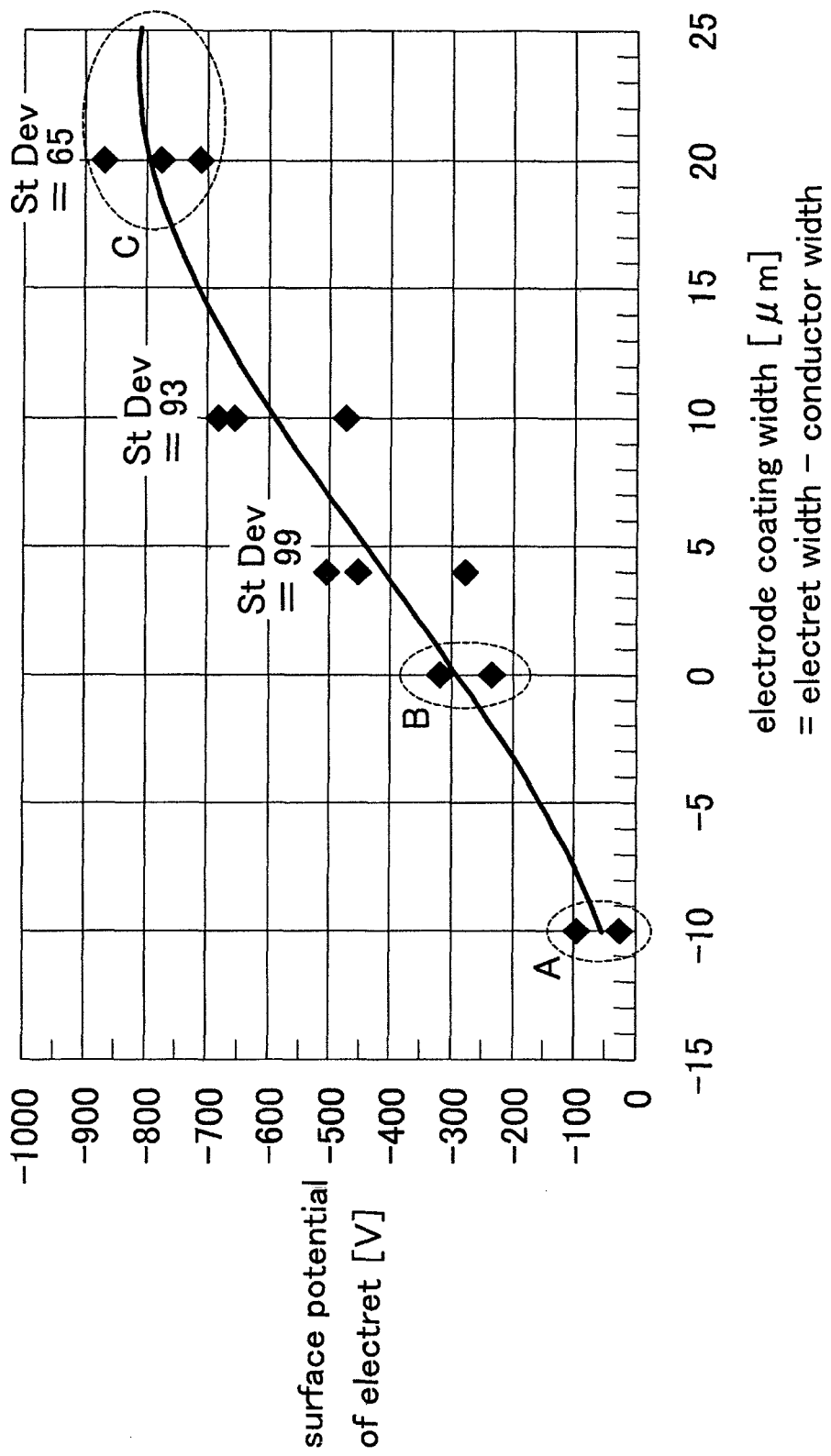
FIG. 7 is a drawing that represents results of experimentally finding a relation between a surface potential of an electret and an electrode coating width of the electret in a conventional example and the first embodiment.

FIG. 7 is a drawing that represents results of experimentally finding a relation between a surface potential of an electret and an electrode coating width of the electret when the same voltage is applied to inject an electric charge in a conventional example and the present embodiment. The horizontal axis in FIG. 7 represents an electrode coating width [μm], and the vertical axis represents a surface potential [V] of the electret 14 or 28. The electrode coating width represents a value obtained by subtracting the width w of the base electrode 27 from the width W of the electret 28 in the present embodiment, and a value obtained by subtracting the width of the base electrode 13 from the width of the electret 14 in the conventional example. Note that, to obtain the data of FIG. 7, the width of the electrets 14 and 28 was set constant (300 μm) and the width of the base electrode 13 or the base electrode 27 was changed.

Figure 2:
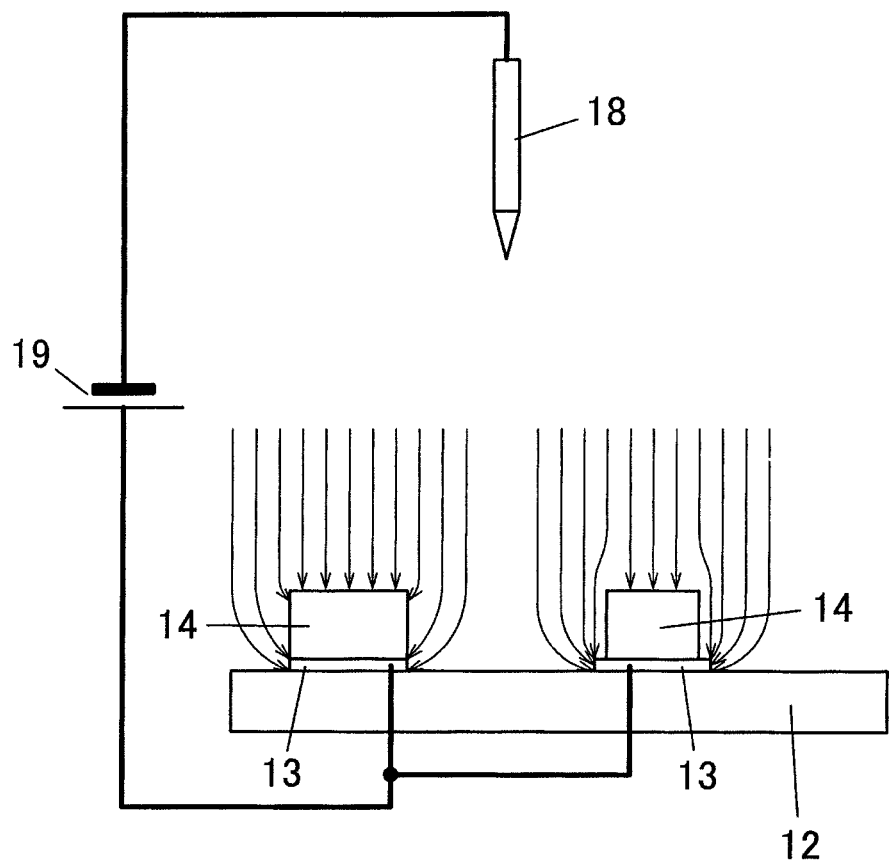
FIG. 2 is a schematic diagram depicting the state in which an electric charge is injected into electrets in the energy conversion device.

Points of measurement in a region A in FIG. 7 represent the case in which, as in the conventional example on the right in FIG. 2, both side ends of the base electrode 13 protrude from the electret 14. Points of measurement in a region B in FIG. 7 represent the case in which, as in the conventional example on the left in FIG. 2, both side surfaces of the base electrode 13 and the both side surfaces of the electret 14 are aligned. Also, those other than the points of measurements in the regions A and B in FIG. 7 represent the case in which, as in the present embodiment, both side surfaces of the base electrode 27 are covered with the electret 28 and, in particular, those in the region C represent a case of the present embodiment.

According to FIG. 7, it can be found that the surface potential of the electret 28 can be increased by coating both side surfaces of the base electrode 27 with the electret 28. Also, as the electrode coating width is larger, the surface potential of the electret 28 is increased. On the other hand, when the electrode coating width is increased to some extent, a ratio of increase of the surface potential of the electret 28 slows down, and a merit of increasing the electrode coating width is not expected. On the contrary, demerits arise such that a substrate area is increased with an increase of the electrode coating width and the number of base electrodes 27 that can be formed on the same substrate area is decreased. Therefore, the electrode coating width in the present embodiment may be equal to or larger than 10 μm and equal to or smaller than 30 μm and, in particular, equal to or larger than 20 μm and equal to or smaller than 30 μm (the region C). In other words, a (one-side) coating thickness of the electret 28 on both side surfaces in a width direction and the end face in a longitudinal direction of the base electrode 27 may be equal to or larger than 5 μm and equal to or smaller than 15 μm and, in particular, equal to or larger than 10 μm and equal to or smaller than 15 μm.

Also, FIG. 7 depicts that an effect can be obtained such that, as long as the electrode coating width is equal to or larger than 20 μm (the coating thickness is 10 μm), fluctuations in surface potential of the electret 28 can be further decreased. That is, FIG. 7 represents a standard deviation St Dev of each surface potential when the electrode coating width is 4 μm, 10 and 20 μm. In FIG. 7, although only the measurement values are shown with electrode coating widths of typical three points, the standard deviation is calculated also in consideration of other measurement values. The obtained results of finding the standard deviations St Dev are as follows.

the standard deviation St Dev=99 [V], when the electrode coating width=4 μm the standard deviation St Dev=93 [V], when the electrode coating width=10 μm the standard deviation St Dev=65 [V], when the electrode coating width=20 μm Based on this experiment, it can be found that fluctuations in surface potential of the electret 28 can be decreased by setting the electrode coating width at 20 μm or larger (or by setting the coating thickness of the electret at 10 μm or larger).

Furthermore, by coating the base electrode 27 with the electret 28, fluctuations in surface potential of the electret 28 due to fluctuations in width of the base electrode 27 can be decreased. Therefore, the process of manufacturing the energy conversion device 21 can be facilitated. Still further, with the base electrode 27 covered with the electret 28, a discharge between the base electrode 27 and the counter electrode 32 at the time of use can be prevented, thereby improving reliability of the energy conversion device 21.

(Using Method)

This energy conversion device 21 is placed at a location or target where vibrations occur. For example, when the energy conversion device 21 is mounted on a vehicle or the like, its vibrations (ambient vibrations) are sensed. When the energy conversion device 51 senses vibrations from outside, these vibrations reciprocate the movable substrate 23 in parallel to the fixed substrate 22. The amount of electric charge induced to the counter electrode 32 of the movable substrate 23 becomes maximum when the counter electrode 32 correctly faces the electret 28 and a superposed area with the electret 28 is maximum. And, as the movable substrate 23 is shifted to decrease the superposed area between the counter electrode 32 and the electret 28, the amount of electric charge to be induced to the counter electrode 32 is decreased. Conversely, as the movable substrate 23 returns in inverse direction to increase the superposed area between the counter electrode 32 and the electret 28, the amount of electric charge to be induced to the counter electrode 32 is increased. As a result, an alternating current flows through the load 35 connected between the base electrode 27 and the counter electrode 32. That is, with vibrations applied to the energy conversion device 21, an alternating electromotive force e occurs between the base electrode 27 and the counter electrode 32.

It is known that, when an optimum load resistance is selected, a maximum output Pmax of the energy conversion device 21 with sine-wave vibrations of the movable substrate 23 at a frequency f is represented by the following Equation 1.

[Equation 1]

$$Pmax = \frac{\sigma^2 n S \cdot 2\pi f}{\frac{\varepsilon \cdot \varepsilon_0}{d}\left(\frac{\varepsilon \cdot g}{d} + 1\right)} \quad \text{(Equation 1)}$$

Symbols used here are as follows:
Pmax: maximum output (maximum value of power)
$\sigma$: surface charge density of the electret
n: the number of counter electrodes 32
d: the thickness of the electret
S: maximum area where the base electrode 27 and the counter electrode 32 superpose each other
f: frequency of vibration
g: gap (interelectrode gap) between the counter electrode 32 and the electret 28
$\varepsilon$: relative dielectric constant of the electret 28
$\varepsilon_0$: permittivity of air In the energy conversion device 21 of the present embodiment, because the amount of electric charge (surface charge density $\sigma$) to be injected into each electret 28 at the time of electric charge injection can be increased. Therefore, as can be seen from Equation 1 mentioned above, the output of the energy conversion device 21 can be increased, and power generation efficiency can be increased.

(Function of Insulating Coating)

In the energy conversion device 21 of the present embodiment, the amount of electric charge of the electret 28 can be increased as described above. However, when the amount of electric charge of the electret 28 is increased, a discharge tends to occur correspondingly between the counter electrode 32 and the base electrode 27. When a discharge occurs, the electric charge of the electret 28 goes out to decrease the amount of electric charge. To prevent discharge, an interelectrode gap g is increased. However, when the interelectrode gap g is increased, power generation efficiency is decreased. Therefore, in the conventional example, a moisture-proof film formed of a parylene film is used to prevent discharge.

By contrast, in the present embodiment, the insulating coatings 31 or 33 made of an insulating inorganic material, such as SiO₂, or an insulating high polymer material, such as polyimide, BCB resin, or SILK resin, is formed on at least one of the fixed substrate 22 and the movable substrate 23. Therefore, the dielectric strength voltage can be improved more than a parylene film, and reliability of the energy conversion device 21 can be improved.

The following Table 1 represents dielectric strength voltages per unit thickness of SiO₂, BCB resin, SILK resin, polyimide, parylene of a C type, parylene of an N type, air, and SF6.

TABLE 1

| material | dielectric strength voltage [V/μm] |
|---|---|
| SiO₂ | 350 |
| BCB resin | 500 |
| SiLK resin | 400 |

TABLE 1-continued

| material | dielectric strength voltage [V/μm] |
|---|---|
| polyimide | 100 |
| parylene (Ctype) | 188 |
| parylene (Ntype) | 240 |
| air | 3.55 |
| SF6 | 8.165-8.875 |

SiO₂, BCB resin, and SiLK resin have dielectric strength voltages per unit thickness higher than those of parylene of the C type and parylene of the N type. Therefore, by using a SiO₂ film as the insulating coating 31 or 33, if the film thickness is the same, the dielectric strength voltage of the energy conversion device 21 can be improved more than the conventional example of using a parylene film as a moisture-proof film.

Also, although polyimide has a dielectric strength voltage per unit thickness smaller than that of parylene, polyimide is inexpensive in cost, and a thick insulating coating can be easily formed, and therefore an insulating coating thicker than a parylene film can be formed. As a result, the dielectric strength voltage of the energy conversion device 21 can be improved more than the conventional example using a parylene film.

Figure 8:
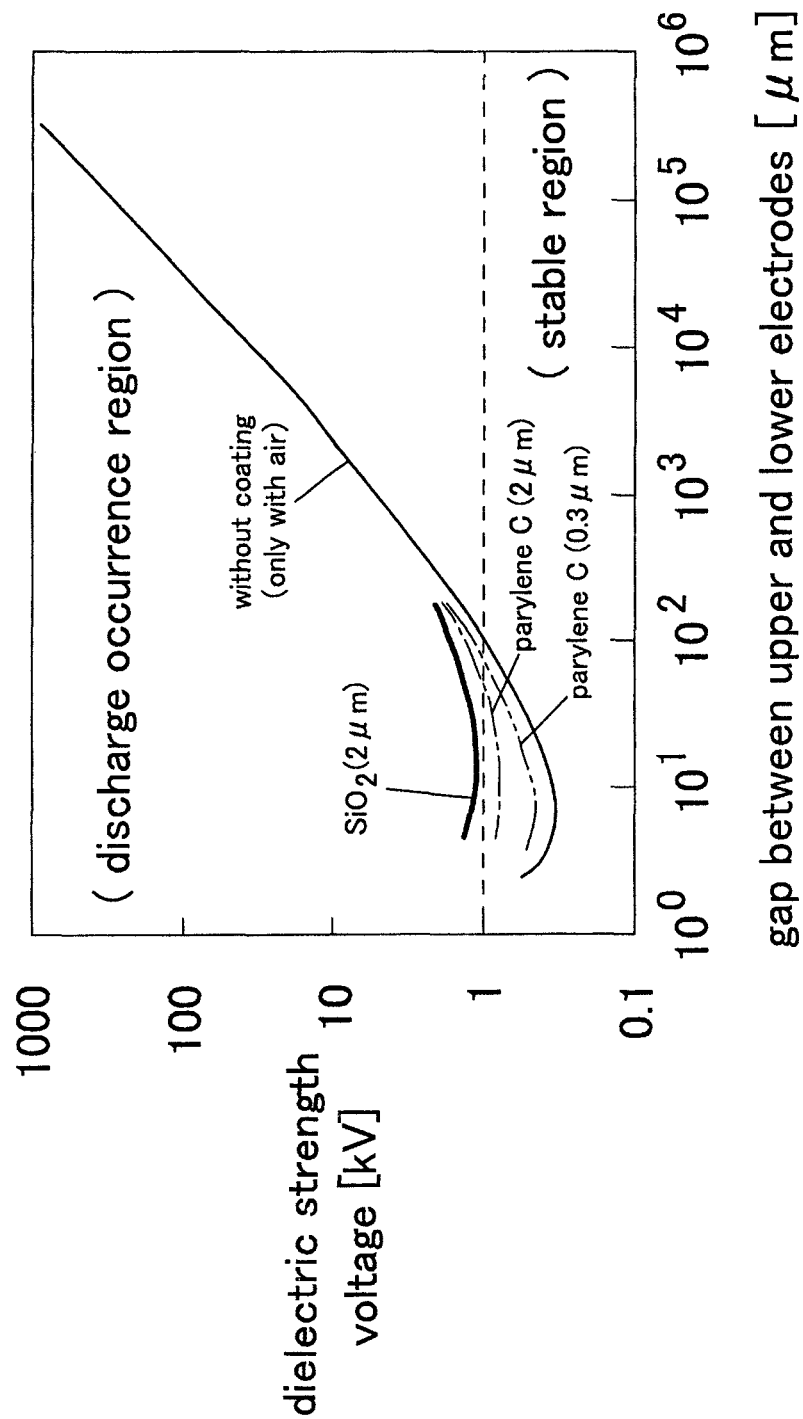
FIG. 8 is a drawing that represents a Paschen curve indicating a dielectric strength voltage between upper electrode and lower electrode.

FIG. 8 is a drawing that depicts a Paschen curve, with its horizontal axis representing the gap g between the upper and the lower electrodes (a distance between the electret 14 and the counter electrode 16 in the conventional example, and a distance between the electret 28 and the electrode 32 in the present embodiment) in logarithmic scale and with its vertical axis representing a dielectric strength voltage in logarithmic scale. The Paschen curve indicates a dielectric strength voltage between the upper and the lower electrodes. A region above the Paschen curve represents a discharge occurrence region where a discharge occurs, and a region below the Paschen curve represents a stable region where no discharge occurs. FIG. 8 depicts dielectric strength voltages in the case without an insulating coating (that is, the case only with air) and the case in which sputtered SiO₂ having a film thickness of 2 μm, parylene of the C type having a film thickness of 2 μm, and parylene of the C type having a film thickness of 0.3 μm are provided either one of the upper and the lower substrates.

Figure 9:
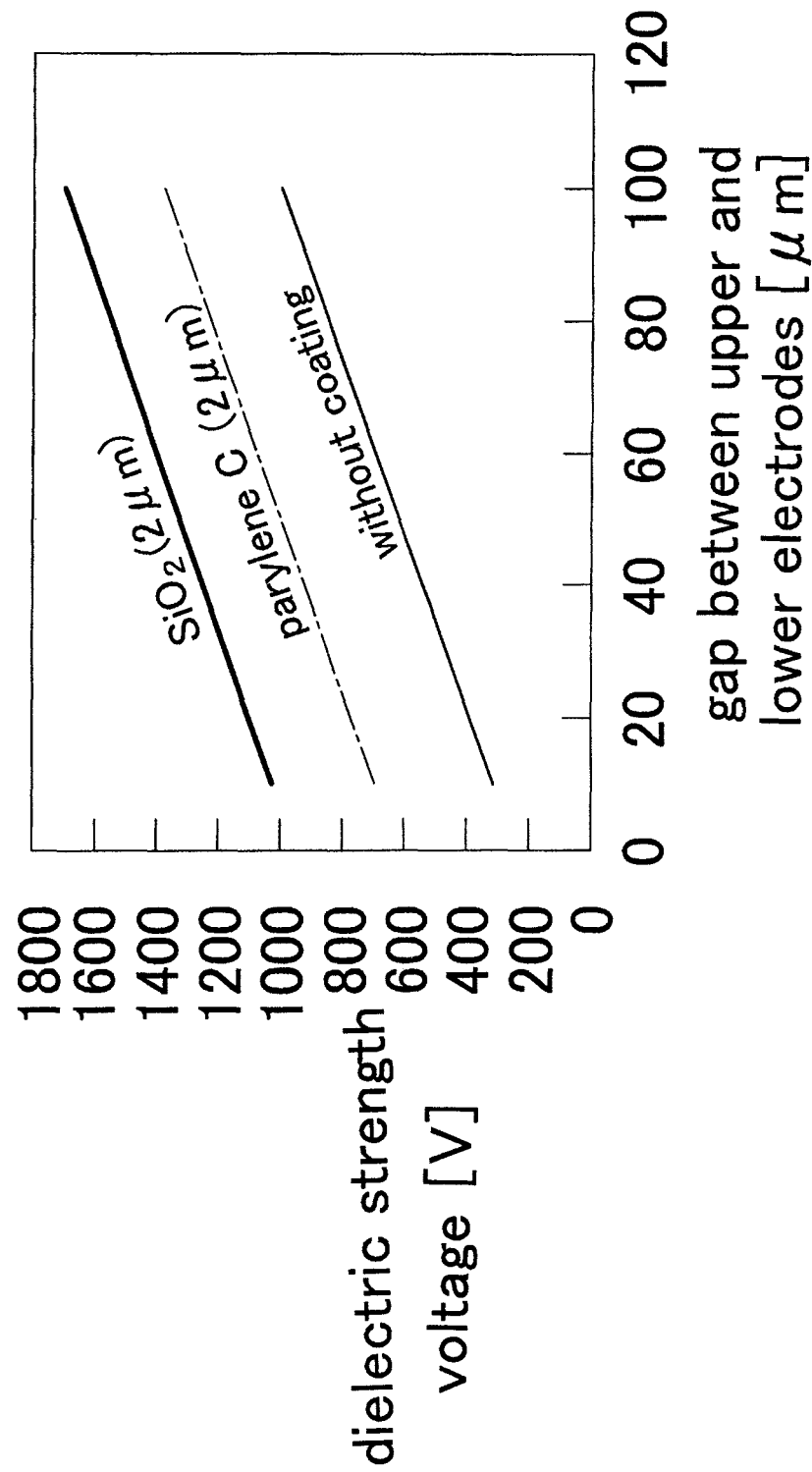
FIG. 9 is a drawing of a representation obtained by partially enlarging FIG. 8.

Also, FIG. 9 is a drawing of a representation obtained by partially enlarging a part of the Paschen curve of FIG. 8, and represents the case of sputtered SiO₂ having a film thickness of 2 μm, parylene of the C type having a film thickness of 2 μm, and no insulating coating.

According to FIG. 8, dielectric strength voltages of the sputtered SiO₂ having a film thickness of 2 μm, the parylene of the C type having a film thickness of 2 μm, and the parylene of the C type having a film thickness of 0.3 μm are all improved more than the case of no insulating coating. However, in an anti-discharge measure in the energy conversion device, as described above, it is desired that discharge is prevented from the electret having a surface potential of 1000 V irrespectively of the interelectrode gap g. According to FIG. 8 and FIG. 9, in the case of no insulating coating, the dielectric strength voltage is below 1000 V when the distance between the upper and the lower electrodes is shorter than approximately 100 μm and, in the case of parylene, the dielectric strength voltage is below 1000 V when the distance between the upper and the lower electrodes is shorter than approximately 50 μm. By contrast, when SiO₂ is used as an insulating coating, the dielectric strength voltage can be maintained to be equal to or higher than 1000 V up to a distance between the upper and the lower electrodes of approximately 10 μm, thereby obtaining a high dielectric strength voltage capability. Therefore, according to the present embodiment, the energy conversion device 21 with a high dielectric strength voltage and high reliability can be fabricated.

Figure 10:
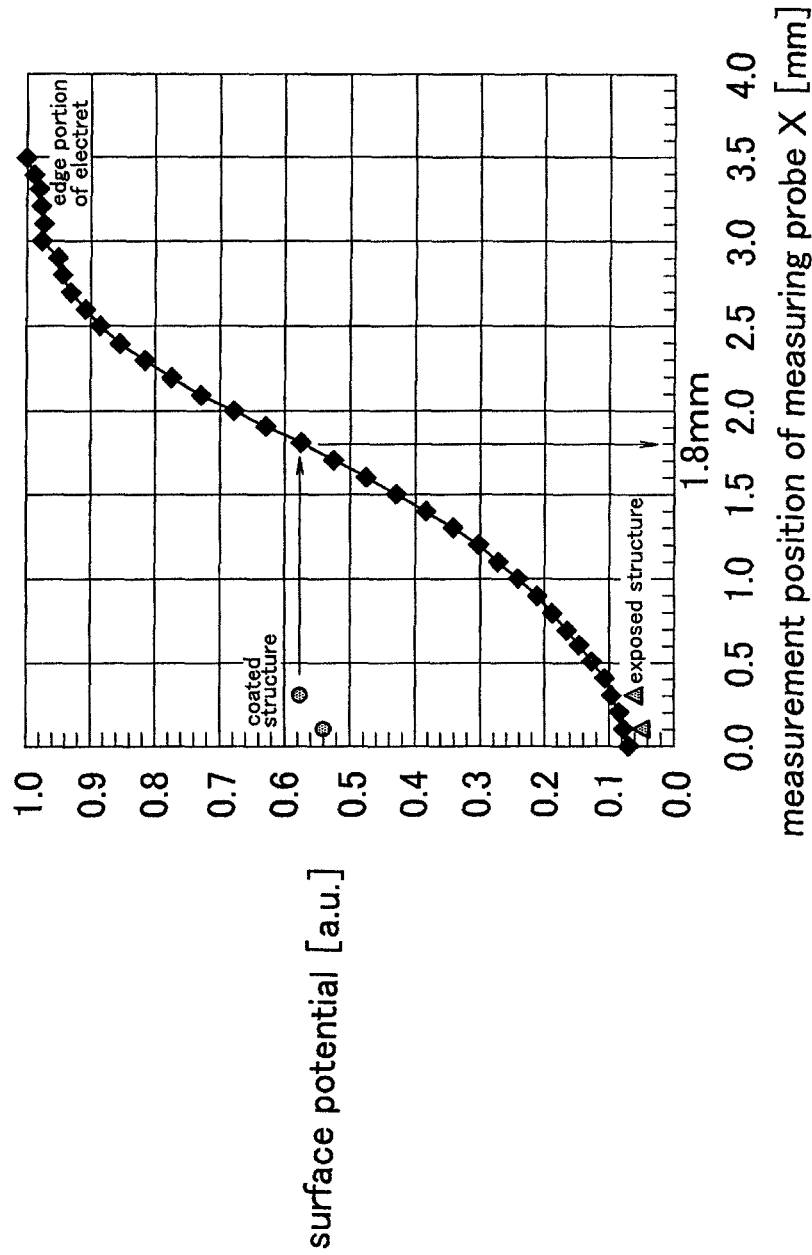
FIG. 10 is a drawing that depicts results of using a sample substrate as depicted in FIG. 11 and measuring its surface potential.
Figure 11:
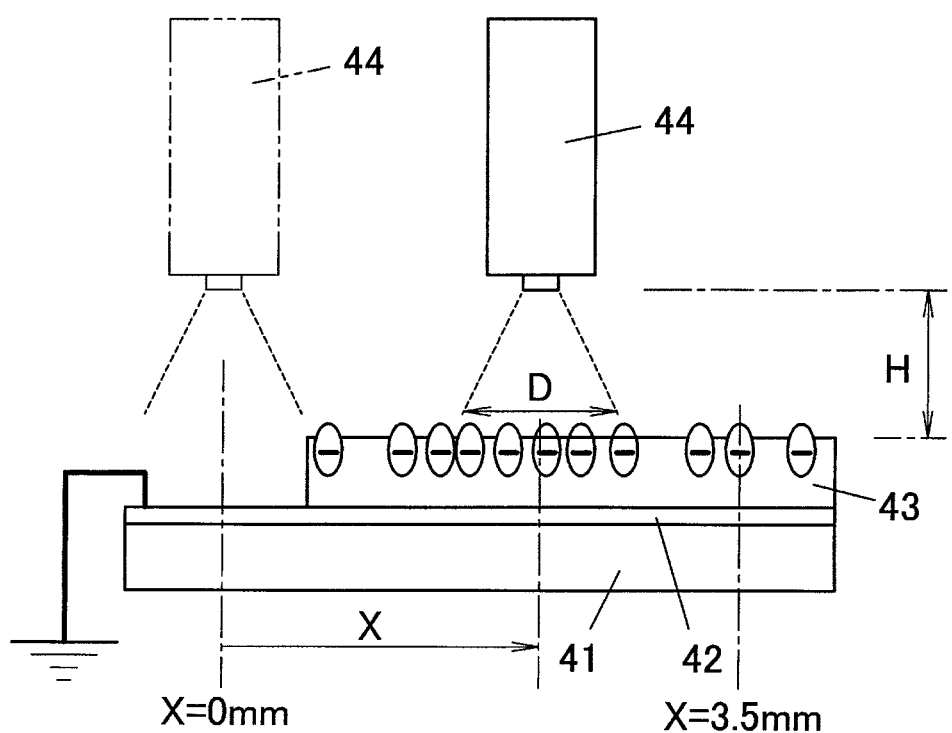
FIG. 11 is a schematic diagram that depicts the sample substrate for obtaining the data of FIG. 10.

Next, a relation between the line width of the electret and an effect of one or more embodiments of the present invention is described. FIG. 10 is a drawing that depicts results of using a sample substrate as depicted in FIG. 11 and measuring its surface potential. Also, FIG. 11 is a schematic diagram that depicts the sample substrate used in this experiment.

The sample substrate depicted in FIG. 11 is obtained by forming a film of a ground electrode 42 on a surface of a glass substrate 41 in a square shape with each side being 30 mm, forming an electret 43 thereon, and removing a width of 5 mm of the electret 43 at one end of the substrate 41 to expose the ground electrode 42. For this sample substrate, the electret 43 was subjected to an electric charge process by corona discharge under the same condition, and the surface potential of the electret 43 is measured (using a surface potential meter manufactured by Monroe). Measurements of the surface potential were performed, with the ground electrode 42 being grounded and with a distance between the electret 43 and a measuring probe 44 being kept at H=1.5 mm, by sweeping of the measuring probe 44 along the surface of the electret 43. The size of a measured region of the measuring probe 44 was D=2.54 mm.

The measurement results are shown in FIG. 10. The vertical axis represents s surface potential, and the horizontal axis represents a position (a measurement position X) of the measuring probe 44 measured from an origin. The origin X=0.0 mm is at a position slightly away from an end of the electret 43 (for example, on the order of 0.4 mm), the position where the ground electrode 42 is exposed. As a result of measurement, as depicted in FIG. 10, it was found that, while a center portion of the electret 43 shows a high surface potential, the surface potential is decreased in a region closer to the exposed region of the ground electrode 42.

Figure 1:
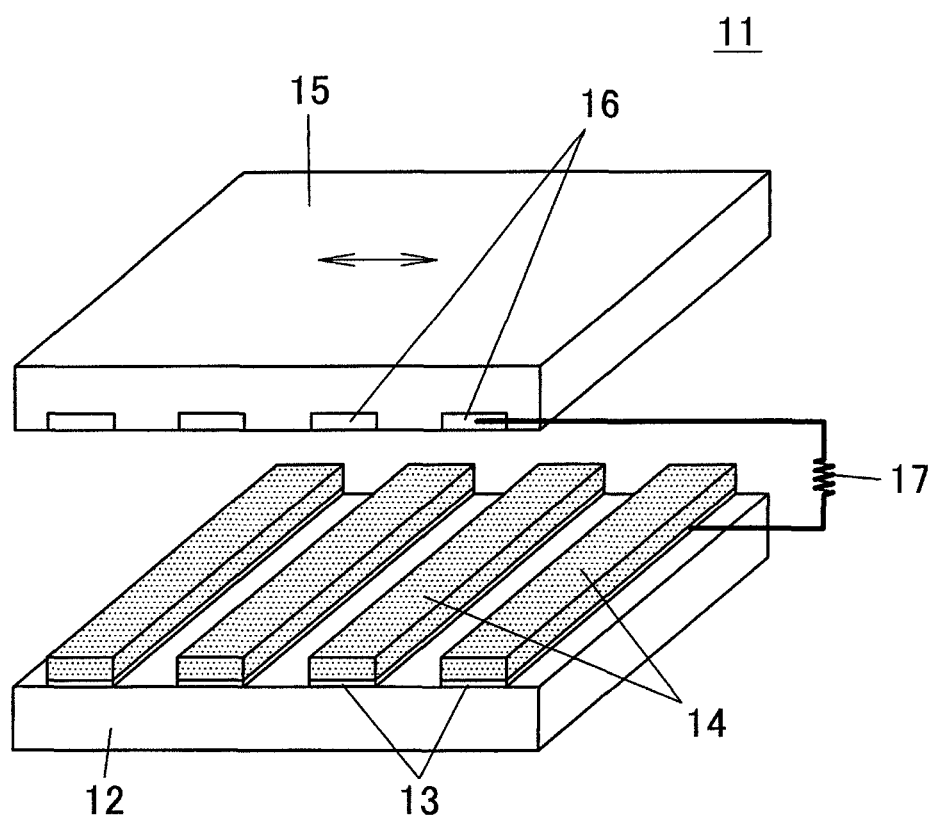
FIG. 1 is a perspective view depicting the structure of an energy conversion device disclosed in Patent Document 1.

At an end on the left of the sample substrate in FIG. 11, the ground electrode 42 is exposed. Therefore, in this region, it can be though that a phenomenon is occurring similar to that the structure in which the ground electrode is exposed from the electret (refer to the conventional example of FIG. 1). Thus, when the surface potentials in the case of the conventional example are plotted on FIG. 10 (triangle marks), they approximately coincide with the actually measured values of the sample substrate. Similarly, also as for the structure in which the ground electrode is covered with the electret (the present embodiment), the surface potentials are plotted on FIG. 10 (circle marks). According to FIG. 10, in the sample substrate, the measurement width of the electret corresponding to the same surface potential as that in the case of the structure where the ground electrode is covered with the electret is 1.8 mm. This can be thought to correspond to one half side of the electret, and therefore the structure of the present embodiment corresponds to that of the sample substrate having an electret width of 3.6 mm. Therefore, when the width of the electret 28 is equal to or smaller than 3.6 mm, it can be thought that a surface potential improving effect by the present embodiment can be exerted.

Figure 12:
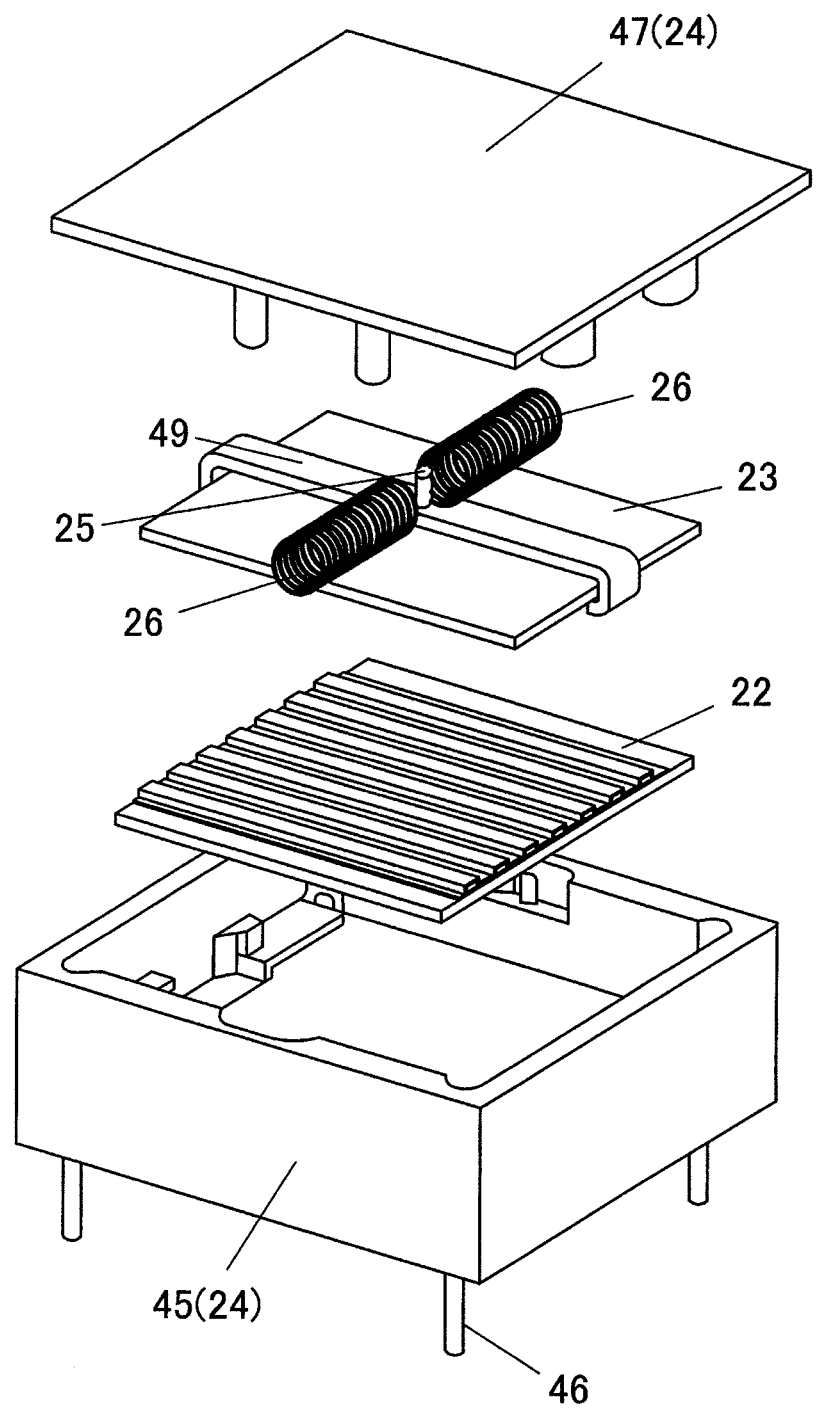
FIG. 12 is an exploded perspective view depicting the structure of a casing of the energy conversion device.

Next, the structure of the casing 24 of the energy conversion device 21 and a process of assembling the energy conversion device 21 are described. FIG. 12 is an exploded perspective view depicting a specific structure of the casing 24. The casing 24 includes a base block 45 and a case cover 47. In the base block 45 a space for accommodating the fixed substrate 22 and the movable substrate 23 is formed, and a plurality of leads 46 protrude from its lower surface. The fixed substrate 22 is placed on a bottom surface in the base block 45, and is electrically connected to the leads 46. Furthermore, the movable substrate 23 is slidably contained in the base block 45 so as to be a predetermined distance away from the fixed substrate 22, and is electrically connected to the leads 46. An upper surface of the base block 45 is closed with the case cover 47.

The above-structured energy conversion device 21 is assembled in a manner as follows. First, the fixed substrate 22 having the upper surface on which the base electrodes 27, the electrets 28, and others are formed is subjected to an electric charge process by corona discharge, thereby injecting an electric charge into the electrets 28. Then, the insulating coating 31 is formed from above the electrets 28 and others.

Also, a frame 49 is mounted on the movable substrate 23 having the lower surface on which the counter electrodes 32 and the insulating coating 33 are formed, and the springs 26 are mounted on the spring fixing part 25 provided on the frame 49.

Next, the fixed substrate 22 is contained in the base block 45 integrally formed with the leads 46, and the fixed substrate 22 is bonded onto its bottom surface. Then, the pad for signal extraction 30 of the fixed substrate 22 and the leads 46 are subjected to wire bonding with gold wire. After the fixed substrate 22 is fixed to the base block 45, a component for gap holding (not shown) is mounted on the fixed substrate 22. With the component for gap holding, the gap is adjusted.

The movable substrate 23 is contained in the base block 45. The movable substrate 23 is slidably held with a predetermined gap with respect to the fixed substrate 22 ensured, and the end of the springs 26 are fixed to an inner surface of the base block 45. Furthermore, the pad for signal extraction of the movable substrate 23 is connected to the leads 46.

Finally, the case cover 47 is placed and bonded onto the upper surface of the base block 45.

(Modification Example of First Embodiment)

Figure 13:
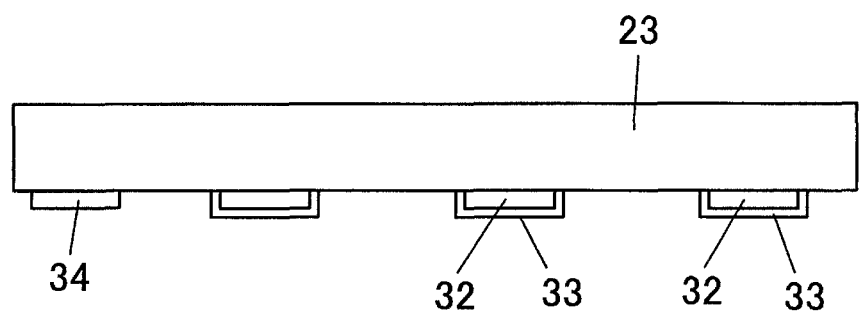
FIG. 13 is a schematic front view depicting a movable substrate in a modification example of the first embodiment.

FIG. 13 is a schematic front view depicting the movable substrate 23 in a modification example of the first embodiment. In this modification example, the insulating coating 33 is formed only in a region where the counter electrodes 32 are formed. Also in this case, the insulating coating 33 is formed by forming a film of an insulating inorganic material by sputtering or CVD or by coating or electrodepositing an insulating organic material.

Figure 14:
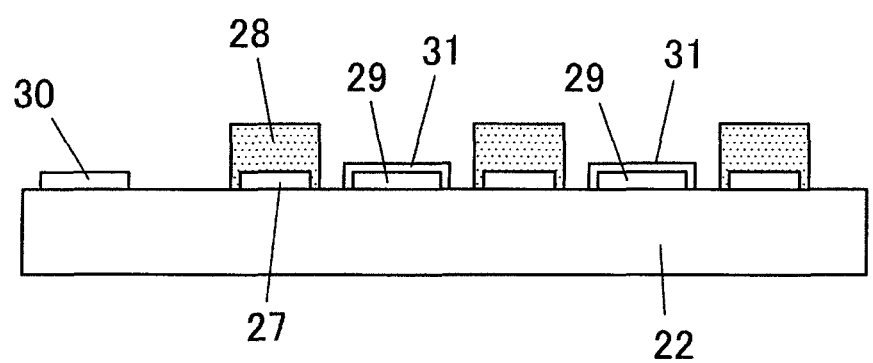
FIG. 14 is a schematic front view depicted a fixed substrate in another modification example of the first embodiment.

Also, FIG. 14 is a schematic front view depicted the fixed substrate 22 in another modification example of the first embodiment. In this modification example, the insulating coating 33 is formed only in a region where the guard electrodes 29 are formed. By combining the fixed substrate 22 structured as depicted in FIG. 14 with the movable substrate 23 as in FIG. 13, an excellent dielectric strength voltage can be obtained. Alternatively, in the fixed substrate 22 structured as depicted in FIG. 14, an excellent dielectric strength voltage can also be obtained by combining it with the movable substrate 23, such as the movable substrate 23 of the first embodiment, in which an insulating coating is formed over an entire region except the pad region.

(Second Embodiment)

Figure 15:
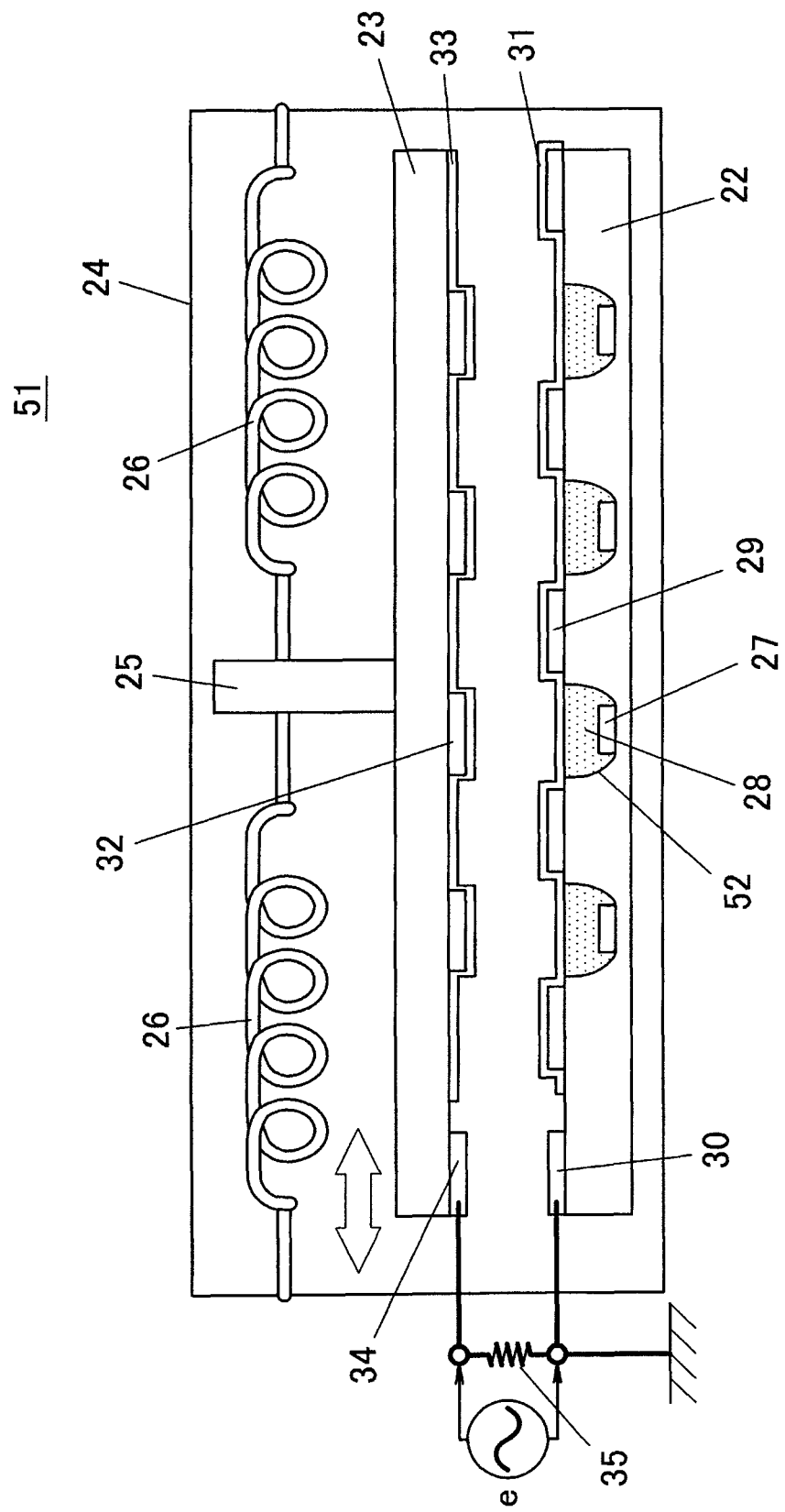
FIG. 15 is a schematic front view depicting the structure of an energy conversion device according to a second embodiment of the present invention.
Figure 16:
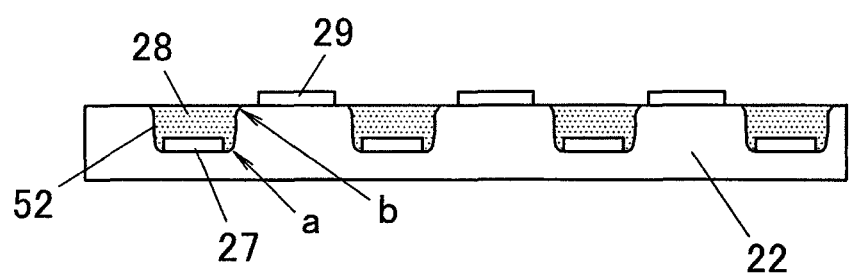
FIG. 16 is a schematic front view of a fixed substrate in a modification example of the second embodiment.
Figure 17:
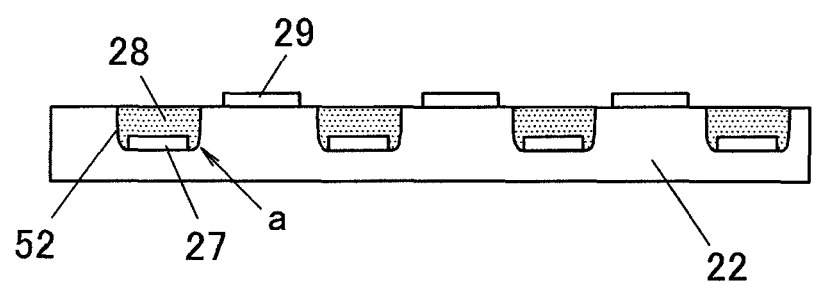
FIG. 17 is a schematic front view of the fixed substrate in another modification example of the second embodiment.
Figure 18:
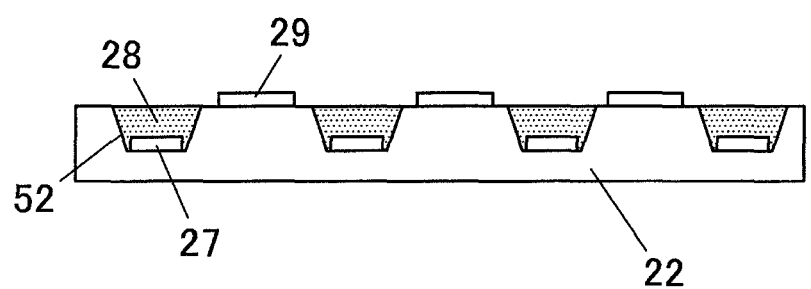
FIG. 18 is a schematic front view of the fixed substrate in still another modification example of the second embodiment.
Figure 19:
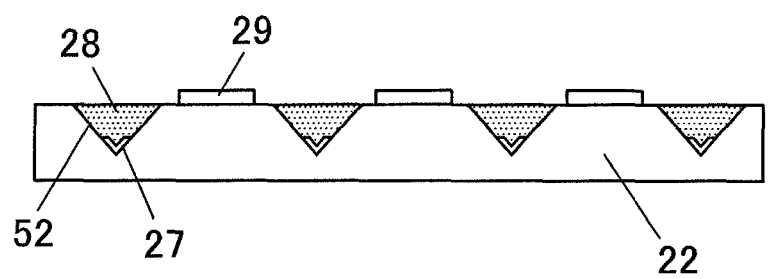
FIG. 19 is a schematic front view of the fixed substrate in still another modification example of the second embodiment.

FIG. 15 is a schematic front view depicting the structure of an energy conversion device 51 according to a second embodiment of the present invention. This embodiment has a feature in which the base electrodes 27 and the electrets 28 are buried in a groove 52 in the fixed substrate 22, and other structures are similar to those of the first embodiment.

In this energy conversion device 51, a plurality of grooves 52 are provided in parallel to each other on the upper surface of the fixed substrate 22 and in a recessed manner. A cross section perpendicular to a longitudinal direction of each groove 52 has a bottom surface being an approximately flat surface, and is curved from both side surfaces to inner corner portions to be in an approximately bowl shape. On the bottom surface of each groove 52, the strip-shaped base electrode 27 is provided along the longitudinal direction of the groove 52. Furthermore, by burying the electret 28 in the groove 52, the base electrode 27 is covered with the electret 28.

According to this embodiment, after the base electrode 27 is provided on the bottom surface of the groove 52 formed in the fixed substrate 22, the groove 52 is filled with the electret 28. With this, the base electrode 27 can be reliably covered with the electret 28, and the possibility that an edge of the base electrode 27 is exposed from the electret 28 due to positional deviation of the electret 28 is small.

Also, if the cross section of the groove 52 is in a rectangular shape, the inner corner portion of the groove 52 is less prone to be filled with the electret 28, thereby possibly causing air bubbles in the inner corner portion. For this reason, in this embodiment, the cross section of the groove 52 is formed in a bowl shape so that an inner corner portion is less prone to occur. With this, air bubbles are less prone to occur in the electret 28.

(Modification Examples of Second Embodiment)

FIG. 16 to FIG. 19 each represent a modification example of the second embodiment. In the modification example depicted in FIG. 16, the cross section perpendicular to a longitudinal direction of the groove 52 is in an approximately rectangular shape, with an inner corner portion (an "a" part in FIG. 16) and an edge of its opening (a "b" part in FIG. 16) of the groove 52 being curved. In the modification example depicted in FIG. 17, the cross section perpendicular to a longitudinal direction of the groove 52 is in an approximately rectangular shape, with only an inner corner portion (an "a" part in FIG. 17) positioned at a lower end of both vertical side surfaces being curved, thereby forming a rectangular shape with a curved inner corner portion. In the modification example depicted in FIG. 18, the cross section of the groove 52 is formed in an inverted trapezoidal shape with its opening wider than its bottom surface. Note that, even in the modification example of FIG. 18, the inner corner portion and the edge of opening of the groove 52 may be curved. In the modification example depicted in FIG. 19, the groove 52 is formed in a V-groove shape (a triangular shape), and the base electrode 27 is also formed so as to have a cross section in a V-groove shape correspondingly. These modification examples of FIG. 16 to FIG. 19 are devised so that air bubbles are less prone to be mixed into the electret 28.

(Groove Processing Method)

Figure 20A:
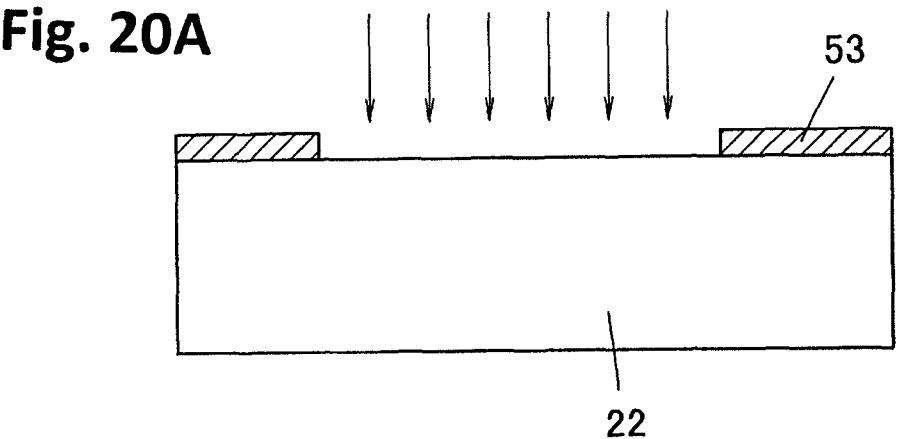
FIGS. 20A and 20B are schematic diagrams depicting an example of a method of forming a groove in a substrate.
Figure 20B:
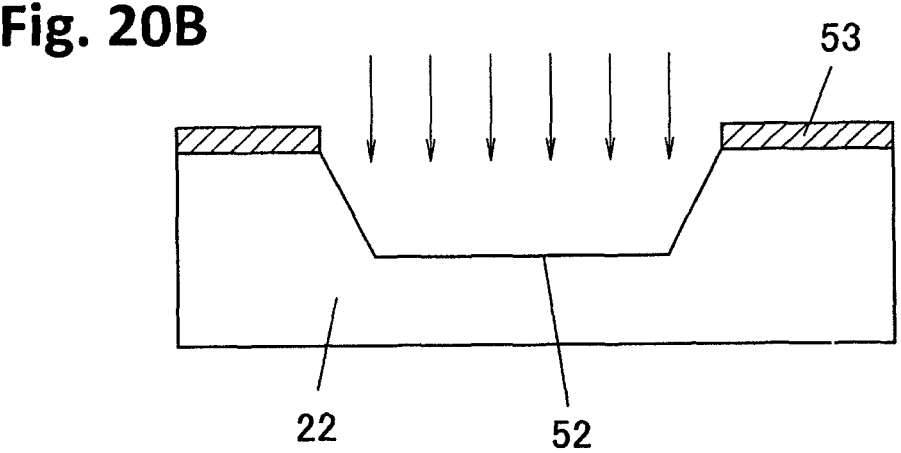

Next, a method of forming the groove 52 in the fixed substrate in the second embodiment and its modification examples is described with reference to FIG. 20A to FIG. 22B. FIGS. 20A and 20B depict the case of using a glass substrate as the fixed substrate 22. In this case, as in FIG. 20A, a surface other than a groove formation region on the fixed substrate 22 is covered with a mask 53, and dry etching or wet etching is performed on the fixed substrate 22 via an opening of the mask 53. With this, as depicted in FIG. 20B, the groove 52 is formed in the fixed substrate 22. Note that a laser processing method may be used in which the groove 52 is formed by scanning with laser light along the groove formation region.

Figure 21A:
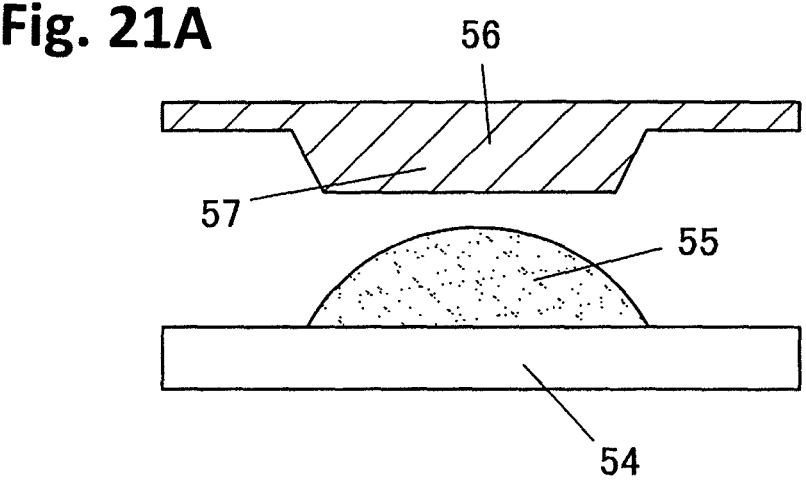
FIGS. 21A, 21B, and 21C are schematic diagrams depicting another method of forming a groove in a substrate.
Figure 21B:
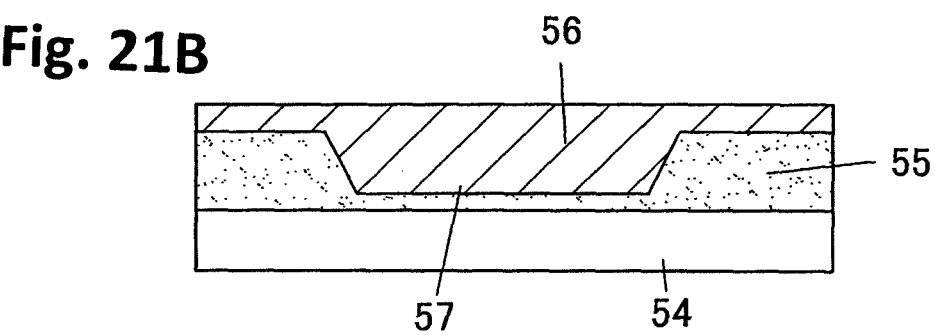
Figure 21C:
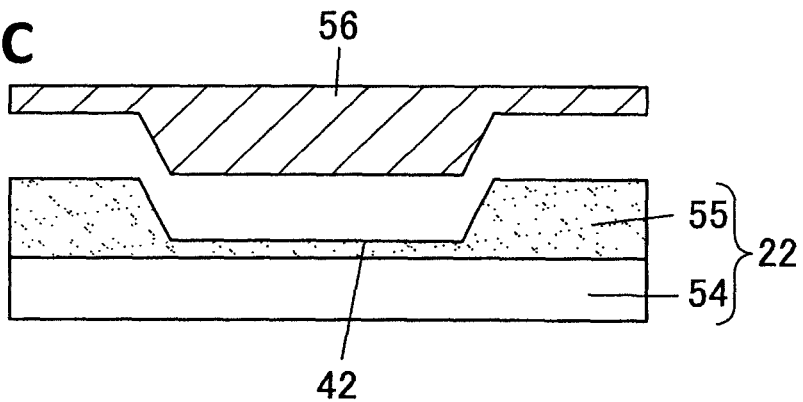

FIGS. 21A to 21C depict the case of configuring the fixed substrate 22 with a glass substrate 54 and a resin 55. In this case, as depicted in FIG. 21A, an ultraviolet-curable resin 55 in a melted state is dripped onto the flat-shaped glass substrate 54, and then, as depicted in FIG. 21B, the resin 55 is pressed by a stamper 56 (a metal mold) formed with a protruding part 57 on a lower surface, thereby spreading the resin 55 between the stamper 56 and the glass substrate 54. Next, the resin 55 is irradiated with ultraviolet light through the glass substrate 54 for photo-curing the resin 55. Then, the stamper 56 is peeled off from the cured resin 55, thereby forming the fixed substrate 22 made of the glass substrate 54 and the cured resin 55 and also forming the groove 52 in the upper surface of the fixed substrate 22.

Figure 22A:
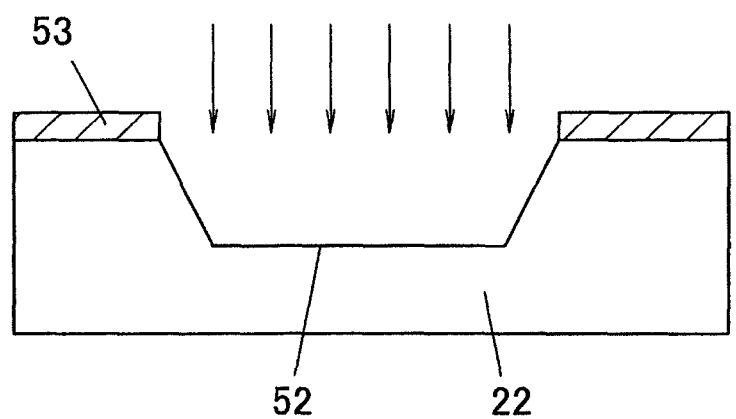
FIGS. 22A and 22B are schematic diagrams depicting still another method of forming a groove in a substrate.
Figure 22B:
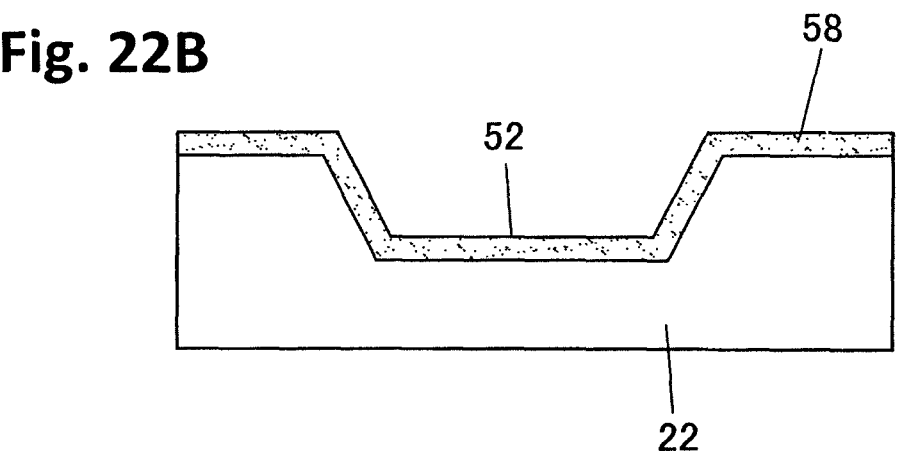

FIGS. 22A and 22B depict the case of using a Si substrate as the fixed substrate 22. In this case, as depicted in FIG. 22A, a surface other than a groove formation region on the fixed substrate 22 is covered with the mask 53, and anisotropic etching or isotropic etching is performed on the fixed substrate 22 via an opening of the mask 53. With this, the groove 52 is formed on the upper surface of the fixed substrate 22. Next, as depicted in FIG. 22B, an insulating film 58, such as a $SiO_2$ film, a SiN film, or a SiON film, is formed on the upper surface of the fixed substrate 22 for an insulating process.

Note that, although the substrate without having an electret is moved by vibrations in each of the embodiments, the substrate having electrets may be moved by vibrations. Also, in one substrate, electrets may be provided to the electrodes only in a partial region (for example, a ½ region) and, in another substrate, electrets may be provided to the electrodes in a region except a region facing the partial region described above (for example, the remaining ½ region).

DESCRIPTION OF REFERENCE NUMERALS 21 energy conversion device
22 fixed substrate
23 movable substrate
27 base electrode
28 electret
29 guard electrode
30 pad for signal extraction
31 insulating coating
32 counter electrode
33 insulating coating
34 pad for signal extraction
52 groove
w width of base electrode
W width of electret While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An energy conversion device for converting mechanical energy into electrical energy, comprising:
   a first substrate and a second substrate facing each other at a predetermined distance away and capable of moving relative to each other;
   at least one conductive member formed on the first substrate and at least one conductive member formed on the second substrate, each conductive member having a surface facing each other;
   a plurality of electrodes, and an electrode pad, disposed on each of the conductive members; and an electret disposed on at least one of the conductive members and formed correspondingly to each of the plurality of electrodes, wherein the electret covers a surface among surfaces of each of the plurality of electrodes that is opposite to a surface fixed to any of the substrates and covers an outer perimeter surface of each of the electrodes with a coating thickness equal to or larger than 5 μm.

2. The energy conversion device according to claim 1, wherein the outer perimeter surface of each of the electrodes, on which the electret is formed, is covered with the electret having a coating thickness equal to or larger than 10 μm.

3. The energy conversion device according to claim 1, wherein at least one of the first substrate and the second substrate has a plurality of grooves provided in parallel to each other and in a recessed manner, wherein the electrodes are each disposed in each of the grooves, and wherein the electret is buried in the groove and the electrode in the groove is covered with the electret.

4. The energy conversion device according to claim 3, wherein the groove has a cross section perpendicular to its longitudinal direction and is a rectangular shape with a curved inner corner portion.

5. The energy conversion device according to claim 3, wherein the groove has a cross section perpendicular to its longitudinal direction and is a trapezoidal shape with an opening portion having a width wider than a width of a bottom surface.

6. The energy conversion device according to claim 3, wherein the groove has a cross section perpendicular to its longitudinal direction and is a triangular shape with a wider opening side.

7. The energy conversion device according to claim 3, wherein the substrate having the grooves is formed of a glass substrate, a semiconductor substrate, or a resin substrate, and wherein the grooves are provided in the substrate in a recessed manner by using dry etching.

8. The energy conversion device according to claim 3, wherein the substrate having the grooves or a part of the substrate is formed of a resin material, and wherein the grooves are provided in a recessed manner by using a transfer technology when the resin material is molded.

9. The energy conversion device according to claim 3, wherein the substrate having the grooves is formed of a Si substrate, wherein the grooves are provided in the substrate in a recessed manner by using anisotropic etching, and wherein the grooves each have a surface formed with an insulating film made of $SiO_2$, SiN, or SiON.

10. The energy conversion device according to claim 1, wherein, on a facing surface of at least one of the first substrate and the second substrate, an entire region of the conductive member, excluding a region where the electrode pads are formed, is covered with an insulating coating.

11. The energy conversion device according to claim 1, wherein only an electrode not covered with the electret is covered with an insulating coating.

12. The energy conversion device according to claim 1, wherein a guard electrode is disposed between adjacent electrets, and wherein, in at least one of the first substrate and the second substrate, only an electrode not covered with the electret and the guard electrode is covered with an insulating coating.

13. The energy conversion device according to claim 10, wherein the insulating coating is formed of an insulating high polymer material.

14. The energy conversion device according to claim 10, wherein the insulating coating is formed of an insulating inorganic material, such as $SiO_2$, SiN, $SrTiO_3$, SiON, and $TiO_2$.

15. The energy conversion device according to claim 11, wherein the insulating coating is formed of an insulating high polymer material.

16. The energy conversion device according to claim 11, wherein the insulating coating is formed of an insulating inorganic material, such as $SiO_2$, SiN, $SrTiO_3$, SiON, and $TiO_2$.

17. The energy conversion device according to claim 12, wherein the insulating coating is formed of an insulating high polymer material.

18. The energy conversion device according to claim 12, wherein the insulating coating is formed of an insulating inorganic material, such as $SiO_2$, SiN, $SrTiO_3$, SiON, and $TiO_2$.

* * * * *